(12) United States Patent
Kepley et al.

(10) Patent No.: US 11,738,884 B2
(45) Date of Patent: Aug. 29, 2023

(54) HEATING CLAMP FOR AIRSHIP CONSTRUCTION

(71) Applicant: LTA Research and Exploration, LLC, Palo Alto, CA (US)

(72) Inventors: Franklin Kyle Kepley, Milpitas, CA (US); Jesus Ricardo Amezquita Zatarain, Fremont, CA (US); Michal Raviv Sayag, Sunnyvale, CA (US); Alexis Jonas Thoeny, San Jose, CA (US); Stephen Benedict Kocsis, Chagrin Falls, OH (US); David Sanchez, San Luis Obispo, CA (US); Shalom Johnson, San Luis Obispo, CA (US); Edward Clements, III, San Luis Obispo, CA (US)

(73) Assignee: LTA Research and Exploration, LLC, Palo Alto, CA (US)

( * ) Notice: Subject to any disclaimer, the term of this patent is extended or adjusted under 35 U.S.C. 154(b) by 539 days.

(21) Appl. No.: 17/020,601

(22) Filed: Sep. 14, 2020

(65) Prior Publication Data
US 2022/0081127 A1 Mar. 17, 2022

(51) Int. Cl.
*B64F 5/10* (2017.01)
*F16L 13/10* (2006.01)
*B29C 65/48* (2006.01)

(52) U.S. Cl.
CPC ............ *B64F 5/10* (2017.01); *B29C 65/4835* (2013.01); *F16L 13/103* (2013.01); *F16L 13/106* (2013.01)

(58) Field of Classification Search
CPC .............................. B29C 65/4835; B64B 1/08
See application file for complete search history.

(56) References Cited

U.S. PATENT DOCUMENTS 3,680,162 A * 8/1972 Glickman ................ A43D 9/00
  12/142 D
4,515,562 A * 5/1985 Williams ................. C21D 9/08
  432/225

(Continued)

FOREIGN PATENT DOCUMENTS

CN  202252611 U  *  5/2012
CN  208535443 U  *  2/2019

OTHER PUBLICATIONS

Slate (all-metal) Airship—the "City of Glendale", available at https://welweb.org/ThenandNow/City%20of%20Glendale.html, 13 pages.

*Primary Examiner* — Jason L Vaughan
*Assistant Examiner* — Amanda Kreiling
(74) *Attorney, Agent, or Firm* — Baker Botts L.L.P.

(57) ABSTRACT

An apparatus for an airship, including: a spacer ring adapted to couple to a joint opening of a joint, the spacer ring having multiple internal protruding portions adapted to form a gap between the spacer ring and a connector inserted into the joint; an injecting clamp adapted to clamp around a first portion of the spacer ring, the injecting clamp having an injecting hole for receiving an adhesive and an outlet for injecting the adhesive to fill a space formed between the joint and a portion of the connector inserted into the joint; and a heating clamp adapted to clamp around a portion of the joint that surrounds the portion of the connector inserted into the joint, the heating clamp including a heat source adapted to heat the adhesive in the space formed between the joint and the portion of the connector during a curing process.

28 Claims, 29 Drawing Sheets

(56) References Cited

U.S. PATENT DOCUMENTS 4,673,122 A * 6/1987 Dubey ................. F16L 55/172
                                                               228/119
4,968,247 A * 11/1990 Olson ..................... H05B 3/06
                                                               219/535

\* cited by examiner

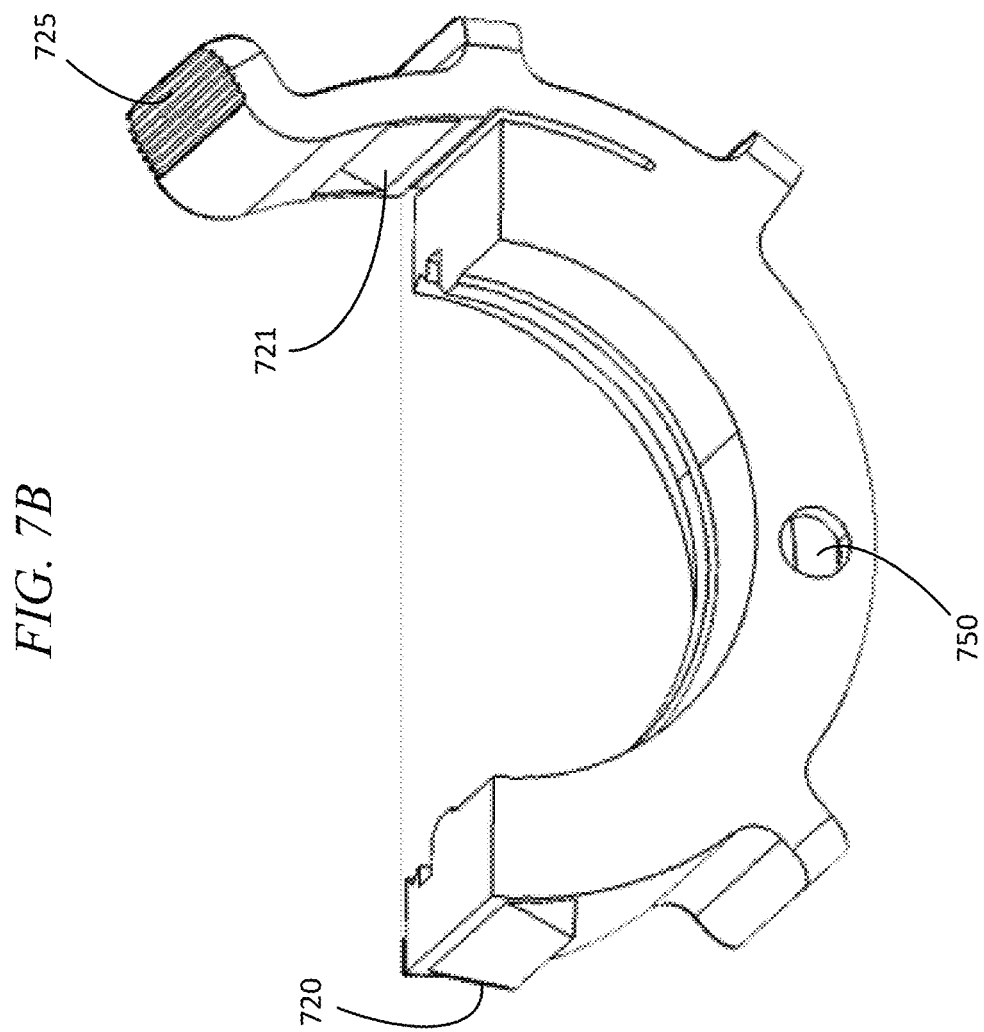

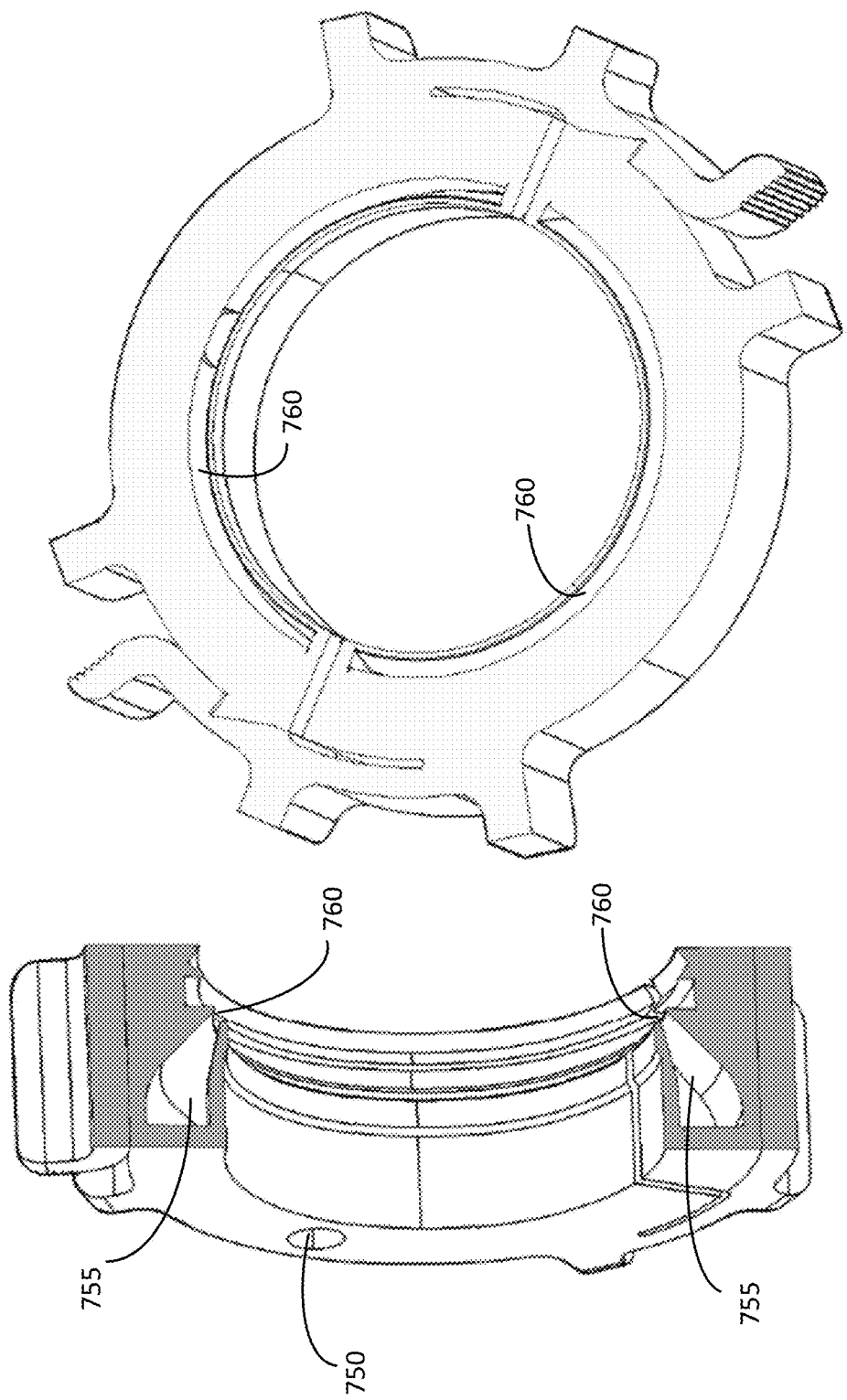

HEATING CLAMP FOR AIRSHIP CONSTRUCTION

TECHNICAL FIELD

This disclosure generally relates to airships or lighter-than-air aircrafts, and more particularly to apparatuses, methods, and systems for constructing the same.

BACKGROUND

Airships are light-than-air aircrafts that obtain the necessary lift for flight based on buoyancy generated by gas that is less dense than the surrounding air. Typically, an airship comprises a structure attached to an envelope that holds lifting gas, such as helium or hydrogen. Certain airships, such as rigid or semi-rigid airships, may have structural framework to help maintain the shape of the envelop.

SUMMARY OF PARTICULAR EMBODIMENTS

Embodiments disclosed herein pertain to systems, apparatuses, and methods for positioning, securing, and bonding the connectors and joints of an airship in a way that enhances the construction safety, speed, and cost-efficiency. These steps may involve properly positioning the connectors within the joint openings, securing the connectors and joint openings to maintain the proper positioning, and curing the adhesives to bond the connectors and joints.

Particular embodiments described herein describe an apparatus for bonding connectors and joints of an airship structure, the apparatus including: a spacer ring adapted to couple to a joint opening of a joint, the spacer ring having multiple internal protruding portions adapted to form a gap between the spacer ring and a connector inserted into the joint through the joint opening; an injecting clamp adapted to clamp around at least a first portion of the spacer ring, the injecting clamp having an injecting hole for receiving an adhesive and an outlet for injecting the adhesive through the gap formed between the spacer ring and the connector to fill a space formed between the joint and a portion of the connector inserted into the joint; and a heating clamp adapted to clamp around a portion of the joint that surrounds the portion of the connector inserted into the joint, the heating clamp including a heat source adapted to heat the adhesive in the space formed between the joint and the portion of the connector during a curing process to bond the joint and the connector. In some embodiments, the heating clamp is further adapted to clamp around a second portion of the spacer ring, and the injecting clamp is further adapted to clamp around the connector. In some embodiments, the spacer ring aligns the connector to be substantially concentric with the joint opening. In some embodiments, the multiple internal protruding portions of the spacer ring are adapted to be in contact with the connector inserted into the joint, and wherein the gap between the spacer ring and the connector is formed by portions of the spacer ring between the internal protruding portions that are not in contact with the connector. In some embodiments, the apparatus further includes a vent ring adapted to couple to an end of the portion of the connector inserted into the joint. In some embodiments, the vent ring aligns the end of the portion of the connector inserted into the joint to be substantially concentric with the joint opening. In some embodiments, the vent ring includes multiple weep holes adapted to allow the adhesive and air to flow out from the space formed between the joint and the portion of the connector inserted into the joint. In some embodiments, the apparatus further includes a controller coupled to the heating clamp configured to control the heat source according to a heating profile.

Particular embodiments described herein describe a heating clamp for curing adhesives between connectors and joints of an airship structure, the heating clamp including: two interlocking components adapted to secure to each other around a portion of a joint that surrounds a portion of a connector inserted into the joint; wherein each of the two interlocking components includes: a heat source disposed along an interior surface of the interlocking component, the heat source being adapted to heat an adhesive injected into a space formed between the portion of the joint and the portion of the connector inserted into the joint; and a port adapted to receive power for powering the heat source. In some embodiments, the heating clamp further includes a controller coupled to each of the two interlocking components, the controller being configured to control the heat source according to a heating profile. In some embodiments, the heating profile specifies an amount of heat and a rate of heat applied to the adhesive by the heat source. In some embodiments, the heating profile includes a ramp-up period, a maintain-period, and a cool-down period. In some embodiments, each of the two interlocking components further includes a sensor for monitoring the heat source. In some embodiments, the port of each of the two interlocking components is further adapted to transfer data associated with the heat source. In some embodiments, each of the two interlocking components further includes a cut-off switch for cutting off the power to the heat source when the heat source exceeds a threshold temperature. In some embodiments, each of the two interlocking components is releasably attached to the heat source and the port. In some embodiments, each of the two interlocking components includes a first end having a protruding portion and a second end having a caved-in portion, the caved-in portion of each one of the interlocking components being adapted to receive the protruding portion of the other one of the interlocking components to secure the two interlocking components to each other. In some embodiments, the second end of each of the two interlocking components includes a pliable arm on which the caved-in portion is disposed. In some embodiments, the pliable arm of each of the two interlocking components is adapted to be pulled back by a user to release the two interlocking components from each other.

Particular embodiments described herein describe an injecting clamp for injecting adhesives between connectors and joints of an airship structure, the injecting clamp including: two interlocking components adapted to secure to each other around a connector inserted into a joint; wherein each of the two interlocking components includes: an injecting hole on an exterior surface of the interlocking component, the injecting hole being adapted for receiving an adhesive from an external source; and a cavity having (1) an inlet coupled to the injecting hole and (2) an outlet disposed along an interior surface of the interlocking component, the inlet, the outlet, and the cavity forming a pathway for injecting the adhesive into a space formed between the connector and the joint. In some embodiments, the inlet is disposed along a first side of the cavity and the outlet is disposed along a second side of the cavity, the first side of the cavity being wider than the second side of the cavity. In some embodiments, the cavity tapers from the first side to the second side. In some embodiments, the cavity extends uniformly along the interior surface. In some embodiments, the outlet forms a curved opening adapted to abut a gap that corresponds to an opening to the space formed between the connector and the joint. In some embodiments, the gap is formed by a spacer ring coupled to a joint opening of the joint, wherein the interior surface of each of the interlocking components further includes a concave portion adapted to secure the spacer ring, the concave portion being disposed adjacent to the outlet of the cavity. In some embodiments, each of the two interlocking components includes a first end having a protruding portion and a second end having a caved-in portion, the caved-in portion of each one of the interlocking components being adapted to receive the protruding portion of the other one of the interlocking components to secure the two interlocking components to each other. In some embodiments, the second end of each of the two interlocking components includes a pliable arm on which the caved-in portion is disposed. In some embodiments, the pliable arm of each of the two interlocking components is adapted to be pulled back by a user to release the two interlocking components from each other.

The embodiments disclosed herein are only examples, and the scope of this disclosure is not limited to them. Particular embodiments may include all, some, or none of the components, elements, features, functions, operations, or steps of the embodiments disclosed above. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 7A-7G illustrate examples of an injecting clamp.

DESCRIPTION OF EXAMPLE EMBODIMENTS

Figure 1:
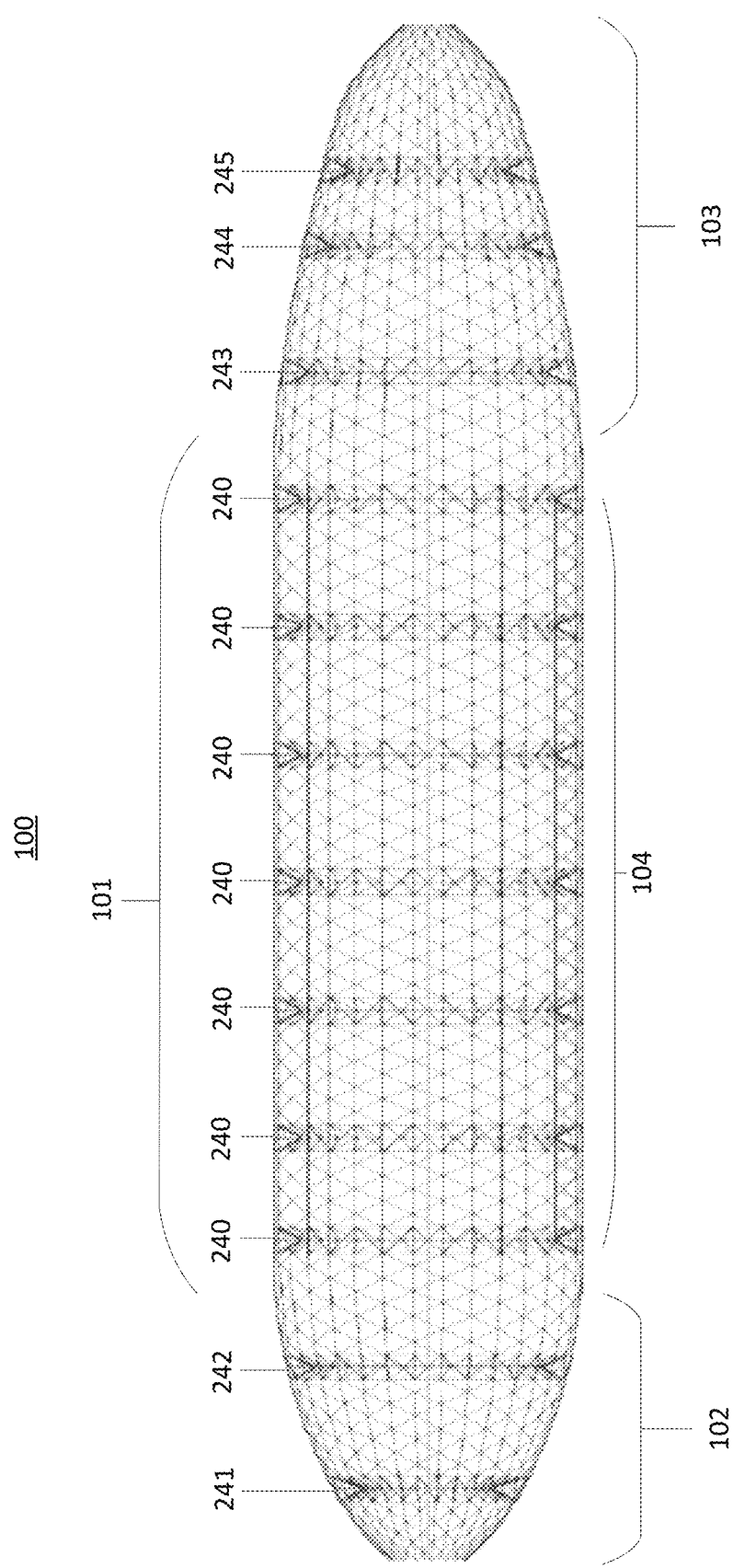
FIG. 1 illustrates an example structure of a rigid airship.

FIG. 1 illustrates an example structure 100 of a rigid airship. The structure 100 may comprise a hull section 101, bow section 102, and stern section 103 to which the airship's rudder may be attached. A hull section 101 may comprise multiple main transverse frames or mainframes with substantially similar attributes (e.g., radius, diameter, circumference, degree of tapering). For example, FIG. 1 illustrates a substantially cylindrical hull section 101 comprising a plurality of mainframes 240. A bow section 102 may comprise multiple mainframes different attributes. For example, FIG. 1 illustrates a tapered bow section 102 comprising tapered mainframes 241 and 242 with different attributes. A stern section 103 may comprise multiple mainframes different attributes. For example, FIG. 1 illustrates a tapered stern section 102 comprising tapered mainframes 243-245 with different attributes. Although FIG. 1 illustrates the structure 100 comprising seven mainframes 240 and five tapered mainframes 241-245, the disclosure of this Application contemplates any number of mainframes and tapered mainframes used for constructing an airship. In particular embodiments, mainframes 240 may be interconnected using longitudinal gangways 104. In particular embodiments, the structure 100 may be divided into multiple segments via mainframes. For example, the hull section 101 illustrated in FIG. 1 may be partitioned into multiple segments at each of the mainframes 240 via wires that are connected across the inner area of the mainframes 240, such that the inner area is substantially covered by the wires. The wires may be constructed with Vectran fiber or any other suitable material with suitable strength and flexibility characteristics. Each of the segments of the structure 100 may be used to hold individual airbags containing lifting gas (e.g., helium, hydrogen, etc.).

Figure 2A:
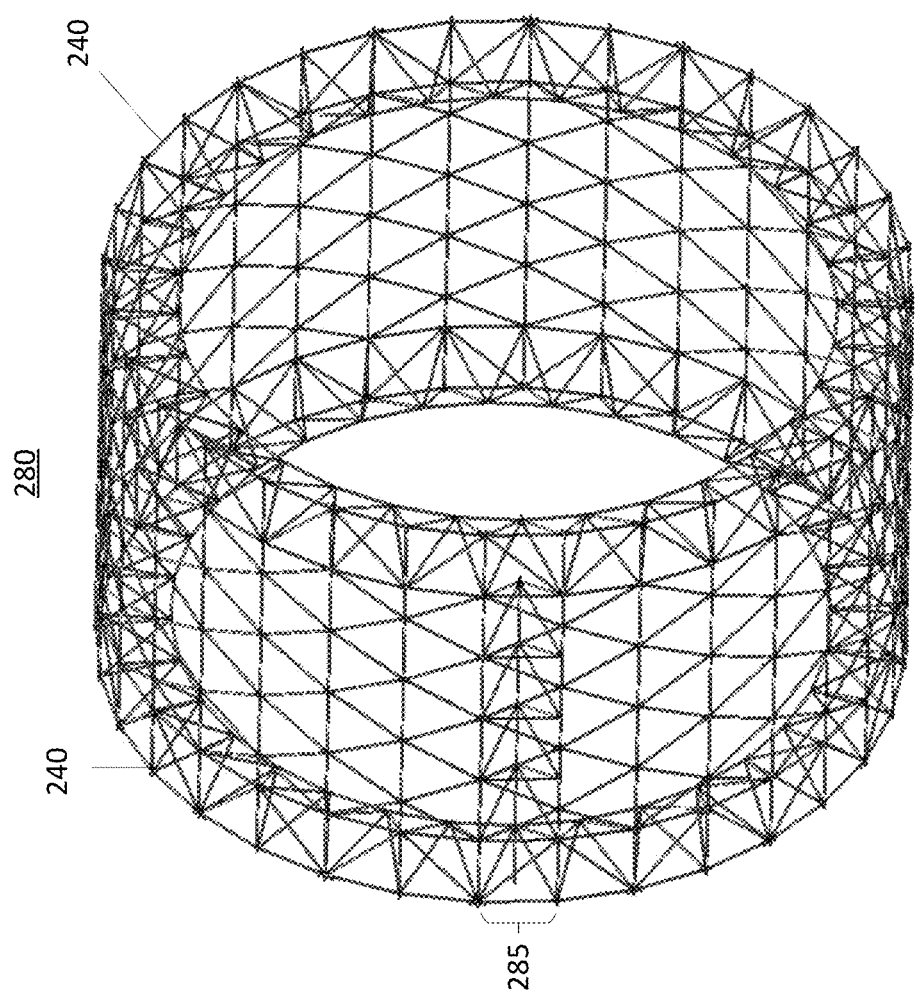
FIG. 2A illustrates an example hull segment of a rigid airship.
Figure 2B:
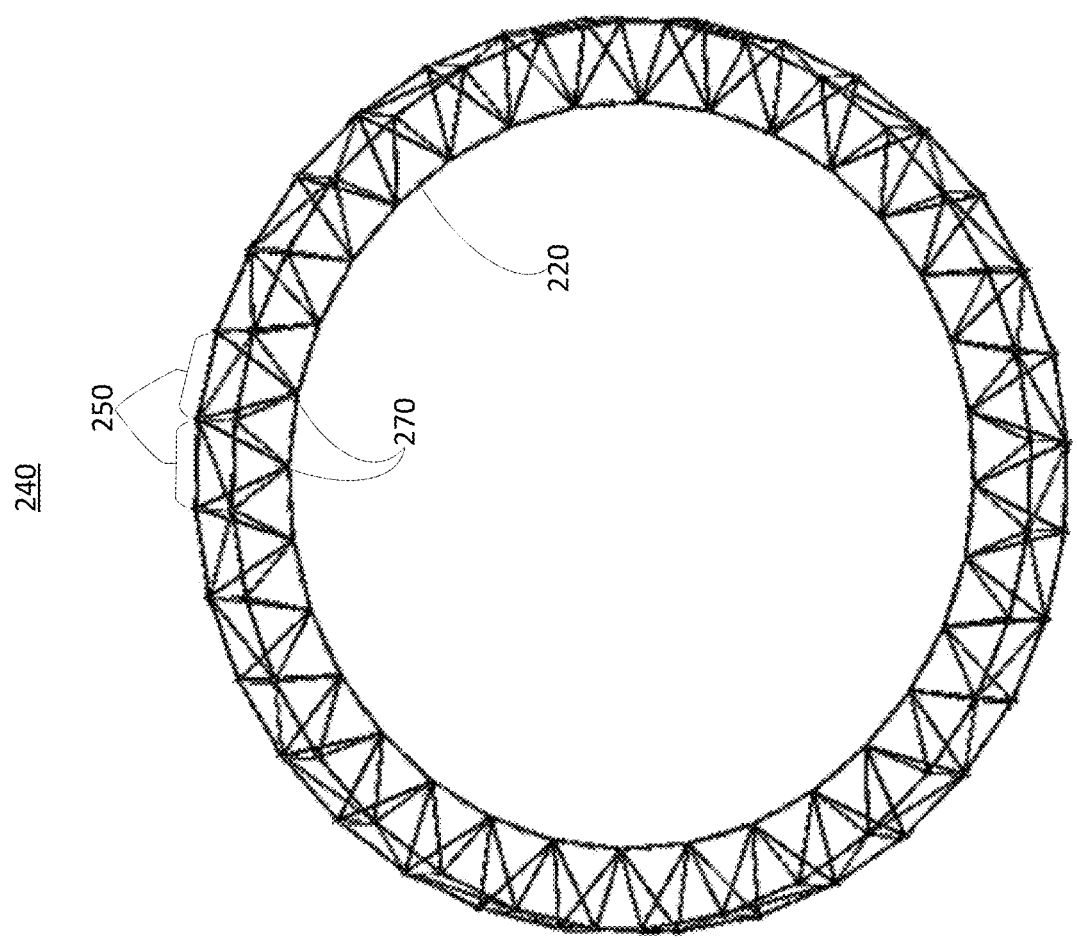
FIG. 2B illustrates an example mainframe that may be used to construct a hull segment.
Figure 2C:
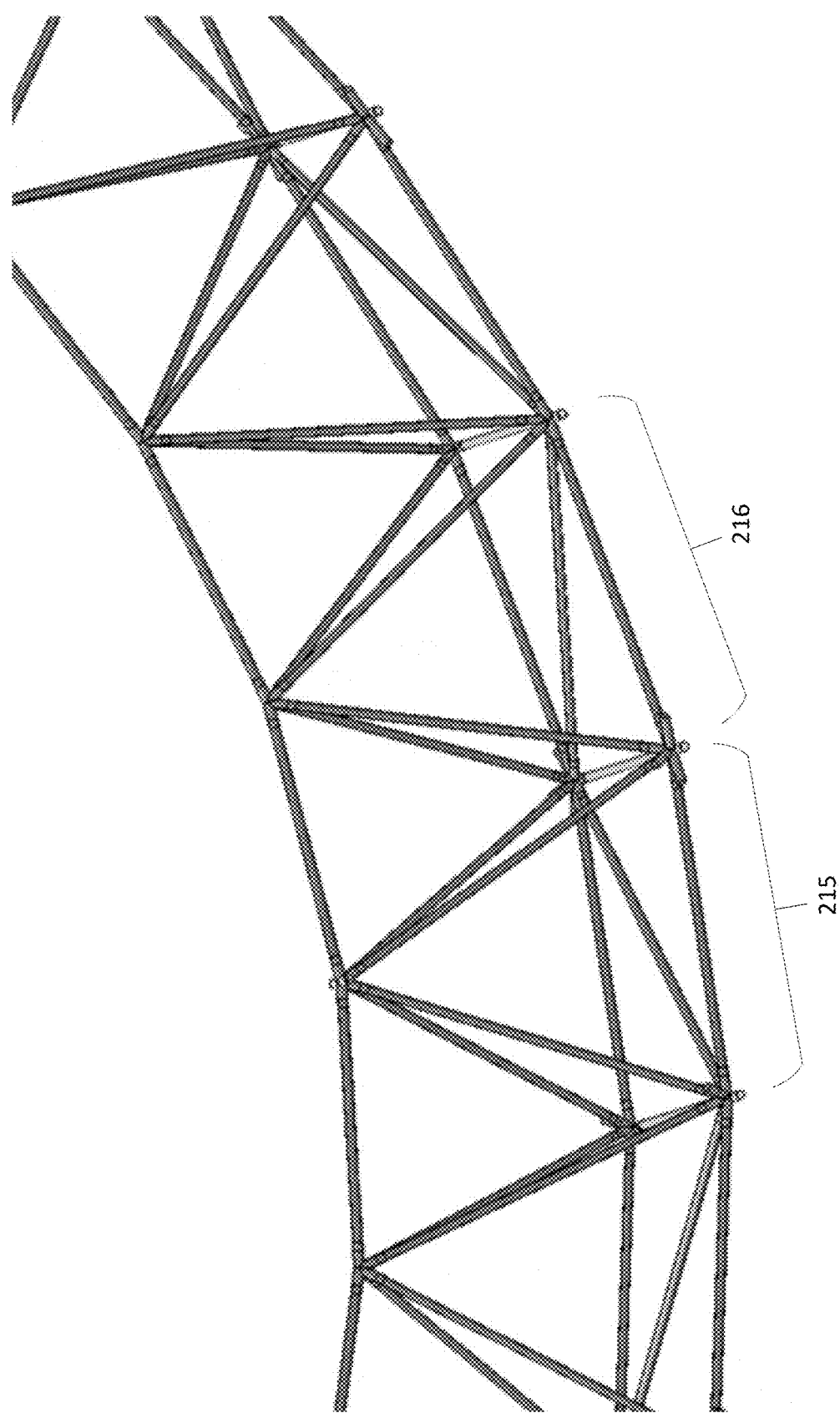
FIG. 2C illustrates a close-up view of a portion of a mainframe.

FIGS. 2A-2C illustrate an example hull segment 280 of a hull section 101. In particular embodiments, a hull segment 280 may be substantially cylindrical and comprised of mainframes, gangways, and geodesic structures. For example, FIG. 2A illustrates a hull segment 280 comprising two mainframes 240, which mainframes 240 are connected to each other via a gangway 285 and geodesic structures (e.g., illustrated as the portion of the hull section 101 between the mainframes 240, excluding the gangway 285). In particular embodiments, segments of a bow section 102 and stern section 103 may be comprised of components such as mainframes, gangways, and geodesic structures in a substantially similar fashion as the hull segment 280 illustrated in FIG. 2A, except the structure of the components may configured differently to account for any tapering of the bow section 102 and stern section 103, respectively.

In particular embodiments, a mainframe may be comprised of a plurality of pyramid structures. For example, FIG. 2B illustrates a non-tapered mainframe 240 comprising a plurality of pyramid structures 250, each pyramid structure 250 comprising a base and an apex. For each of the pyramid structures 250 in a mainframe, the apex points toward the center of the mainframe and the base faces outwards. A mainframe's outer portion (i.e., outer circumference) may be comprised of bases of pyramid structures, and the mainframe's inner portion (i.e., inner circumference) may be comprised of apexes of pyramid structures. For example, FIG. 2B illustrates mainframe 240's outer circumference being formed by the bases of pyramid structures (e.g., pyramid structures 250), and the mainframe 240's inner circumference being formed by connectors connecting the apexes of the pyramid structures (e.g., connectors 220 connecting apexes 270). FIG. 2C illustrates a close-up view of a portion of a non-tapered mainframe comprising a plurality of pyramid structures (e.g., pyramid structure 215 and 216). In particular embodiments, tapered mainframes may be constructed in a similar fashion as the non-tapered mainframes but with slightly different configurations to accommodate the tapered configuration of the tapered mainframes.

Figure 3:
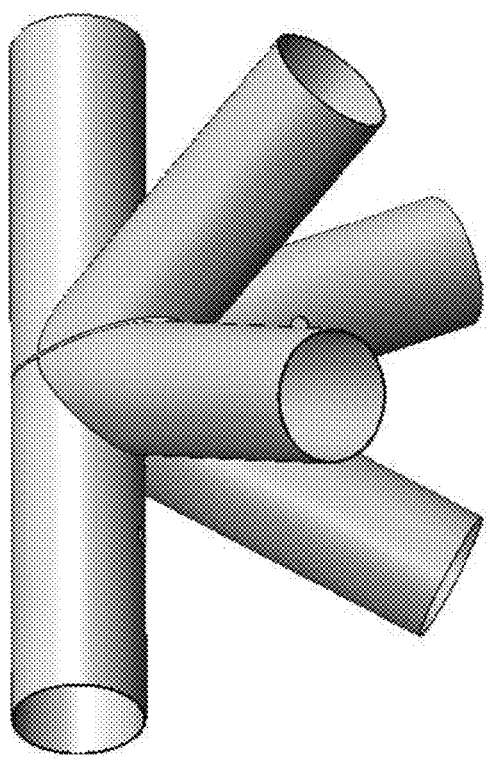
FIG. 3 illustrates an example apex joint used in the construction of a pyramid structure.
Figure 4:
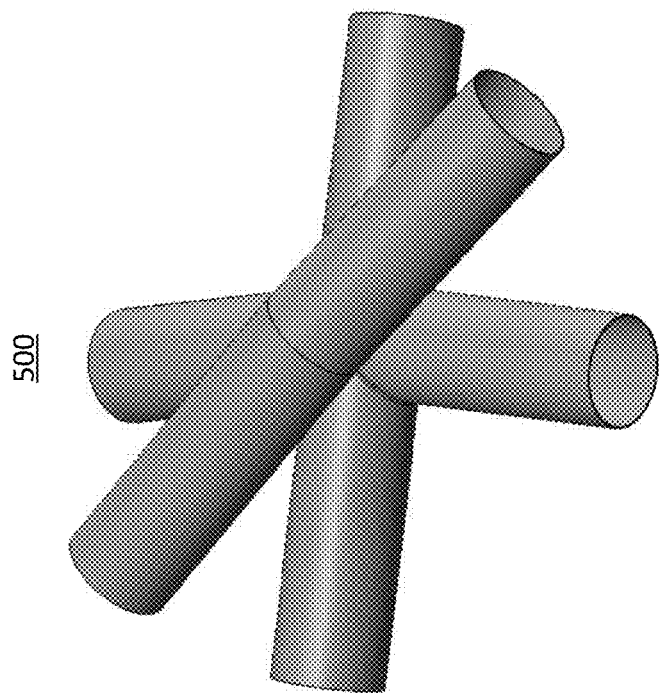
FIG. 4 illustrates an example 6-way geodesic joint used in the construction of a geodesic structure.
Figure 5A:
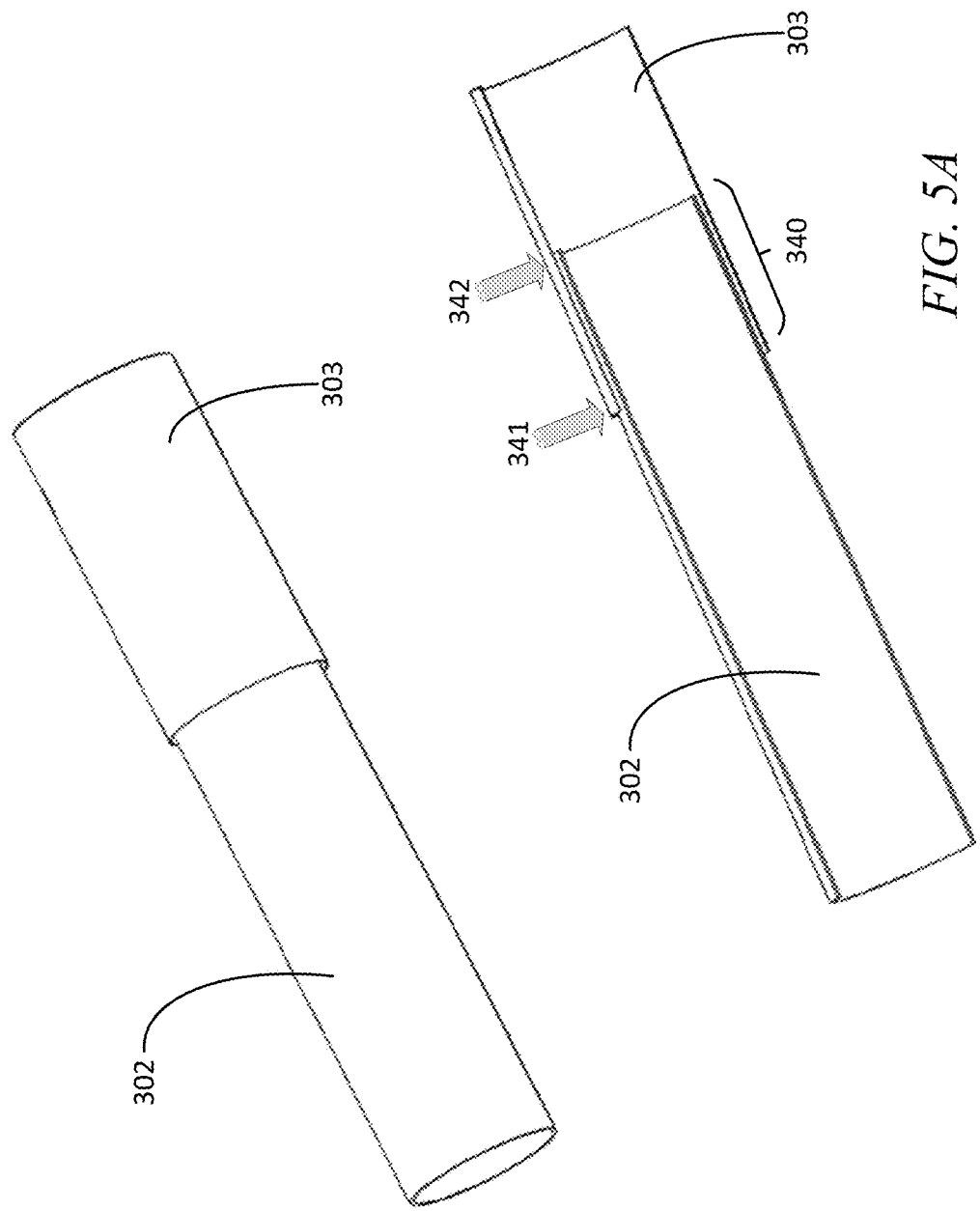
FIG. 5A illustrates an example of a connector inserted into a joint opening.

FIGS. 3-4 illustrate examples of joints used in the construction of an airship. For example, FIG. 3 illustrates a joint 400 that may be used as an apex joint for a pyramid structure. FIG. 4 illustrates a joint 500 that may be used as a 6-way geodesic joint a geodesic structure. To construct various portions of the airship, connectors may be first secured to the joints, then attached and/or bonded. A joint may be connected to multiple lengths of connectors (e.g., tubes or rods) with adhesives, by welding, or any other methods suitable for connecting joints and connectors for the construction of an airship. Connectors and joint openings (e.g., slots) may be substantially cylindrical. In particular embodiments, the radius of the connectors may be slightly smaller than the radius of the joint openings to allow the connectors to be inserted into the joint openings. For example, FIG. 5A illustrates a connector 302 inserted into a joint opening 303. Alternatively, the radius of the connectors may be bigger than the radius of the joint openings to allow the joint openings to be inserted into the connectors. In particular embodiments, connectors may be fishmouth cut so that the connectors may be joined together without any gaps and without bending the connectors.

The invention disclosed herein describe the steps of positioning, securing, and bonding the connectors and joints of an airship in a way that enhances the construction safety, speed, and cost-efficiency. These steps may involve properly positioning the connectors within the joint openings, securing the connectors and joint openings to maintain the proper positioning, and curing the adhesive to bond the connectors and joints.

Properly positioning a connector 302 within the center of a joint opening 303, i.e., positioned to be substantially concentric or coaxial, allows the adhesive that are later injected to be uniformly distributed between the connector 302 and joint opening 303. As illustrated in FIG. 5A, when a connector 302 is inserted into a joint opening 303, there is a space 340 between the connector 302 and joint opening 303 at the overlapping portion, to which adhesive may be injected into. Uniformly distributing the adhesive optimizes the structural integrity of the connector 302 and joint opening 303 when they are bonded by the curing process.

Figure 5B:
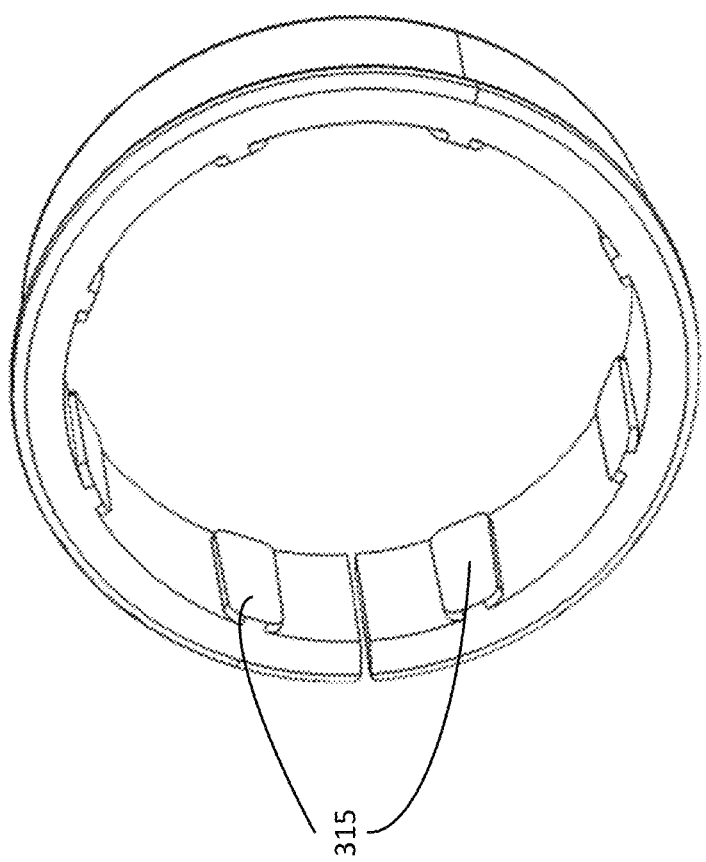
FIG. 5B-5C illustrate examples of a spacer ring.
Figure 5C:
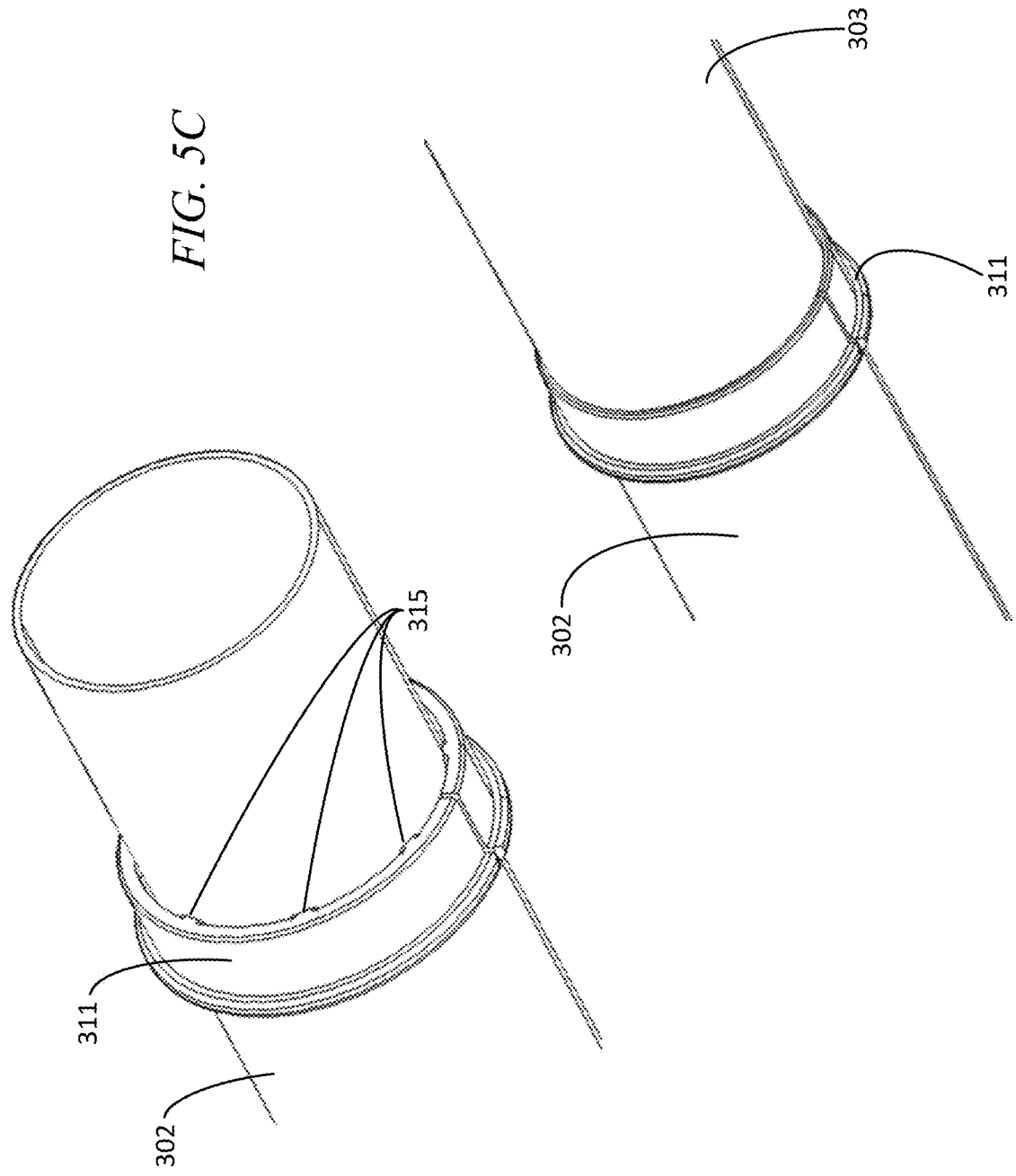
Figure 5D:
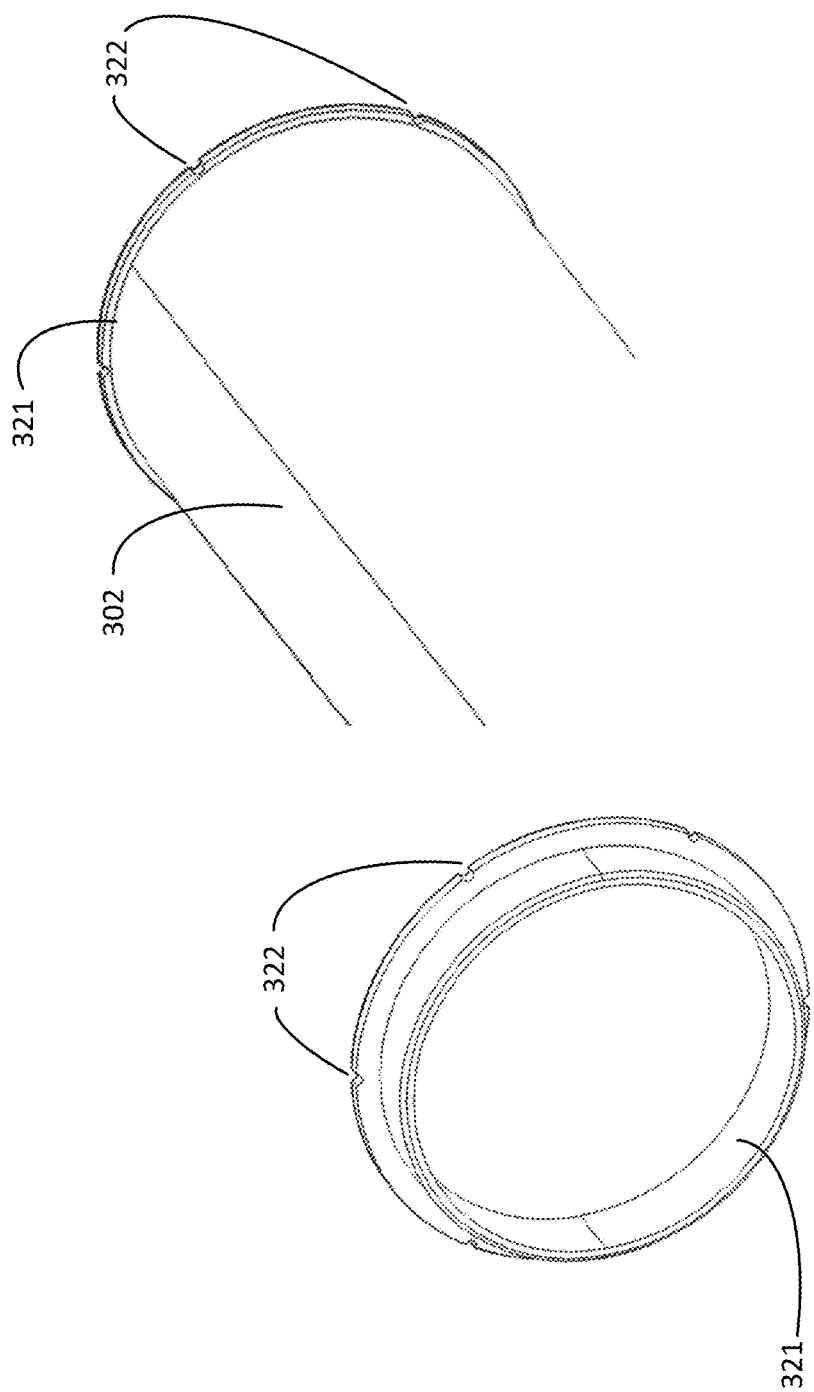
FIG. 5D-5E illustrate examples of a vent ring.
Figure 5E:
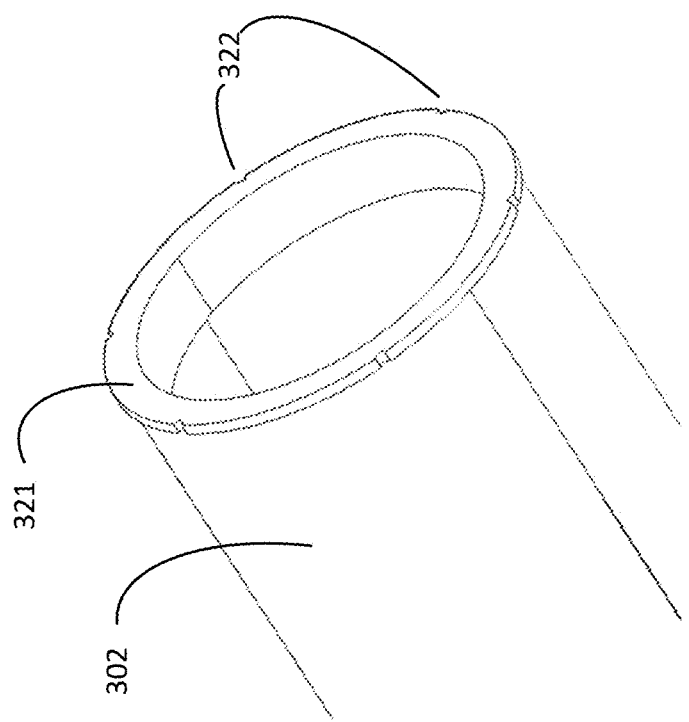
Figure 5E:
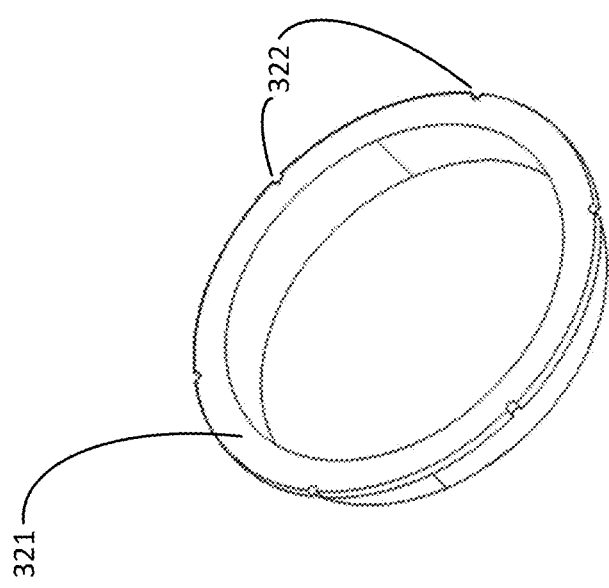
Figure 5F:
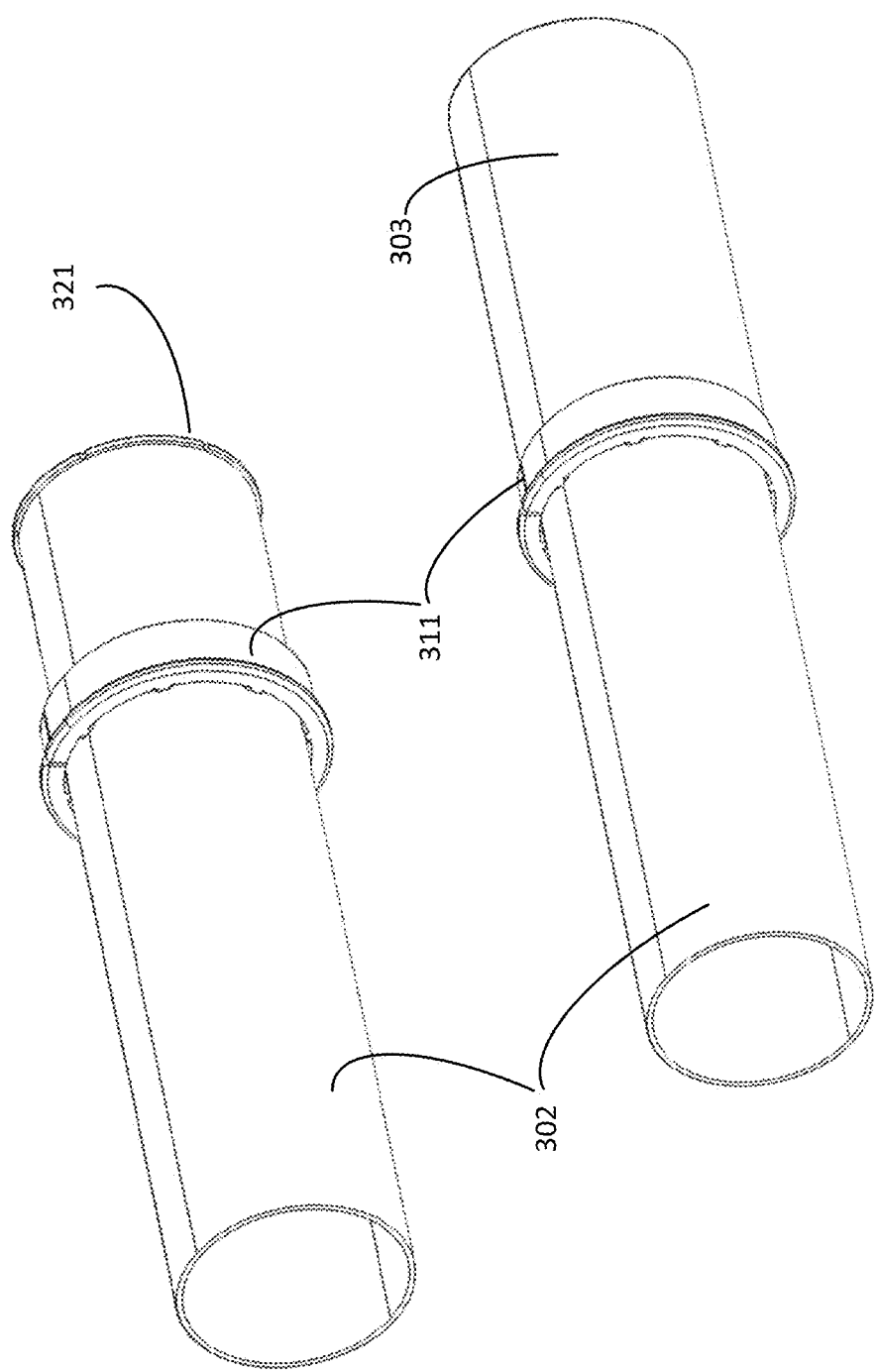
FIG. 5F illustrates an example of a spacer ring and vent ring configured on a connector.

In particular embodiments, a spacer ring and a vent ring may be used to centrally position a connector 302 within a joint opening 303, i.e., positioned to be substantially concentric or coaxial. FIG. 5B illustrates an example of a spacer ring 311. FIG. 5C illustrates a spacer ring 311 in two different views, the top view illustrating a spacer ring 311 configured around a connector 302 and the bottom view illustrating the same but with the connector 302 inserted into a joint opening 303. Referring to FIG. 5A, while a spacer ring 311 may be used to centrally position a connector 340 at the front end 341 of the overlapping portion, a second ring may be required to centrally position the connector 340 at the back end 342 of the overlapping portion. In particular embodiments, a vent ring may be configured at the end of a connector 302 to centrally position the connector 302 at the back end of the overlapping portion 342. FIGS. 5D-5E illustrate examples of a vent ring 321, the left views illustrating a vent ring 321 by itself and the right views illustrating a vent ring 321 configured at the end of a connector 302. FIG. 5F illustrates examples of a spacer ring 311 and vent ring 321 configured on a connector 302 (the vent ring 321 in the bottom view of FIG. 5F cannot be seen because it is within the joint opening 303, thus covered by it). Using both a spacer ring 311 and a vent ring 321 to centrally position a connector 302 within a joint opening 303 allows the connector 302 to be evenly distanced from the joint opening 303 throughout the entire overlapping portion (e.g., space 340 illustrated in FIG. 5A). As discussed in more detail below, this allows the adhesive to be injected into the space 340 in an evenly distributed fashion and further ensures no air pockets remain in the space 340 after the injecting process.

Figure 6A:
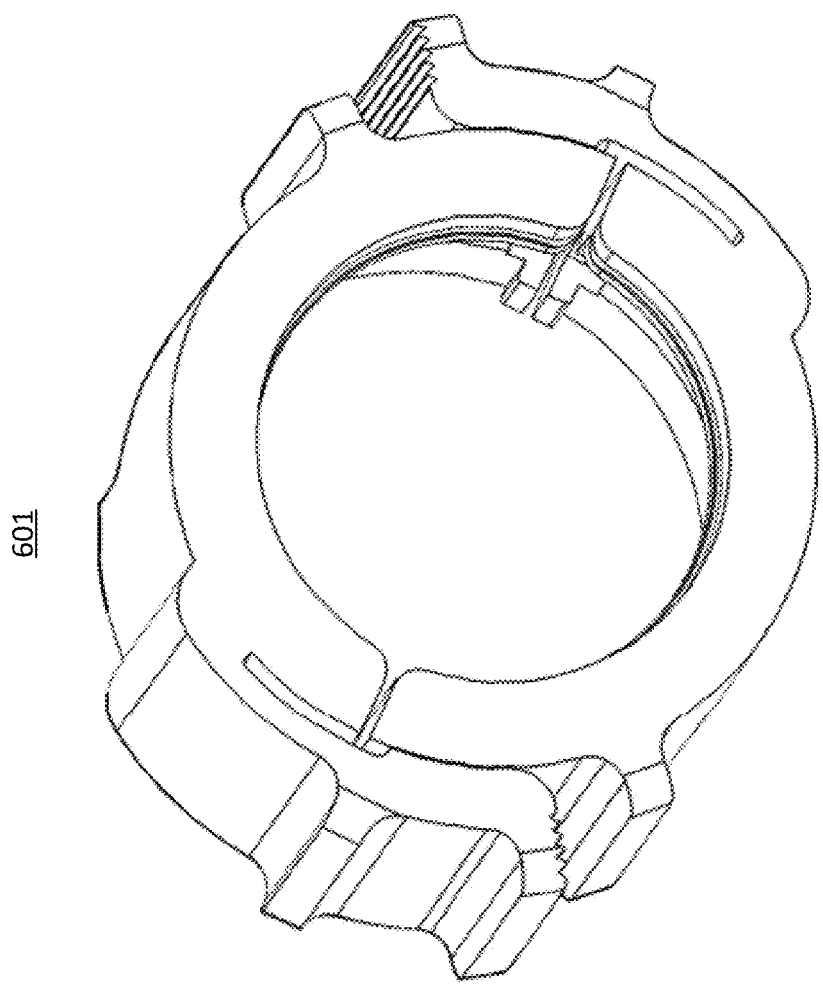
FIGS. 6A-6C illustrate examples of a securing clamp.
Figure 6B:
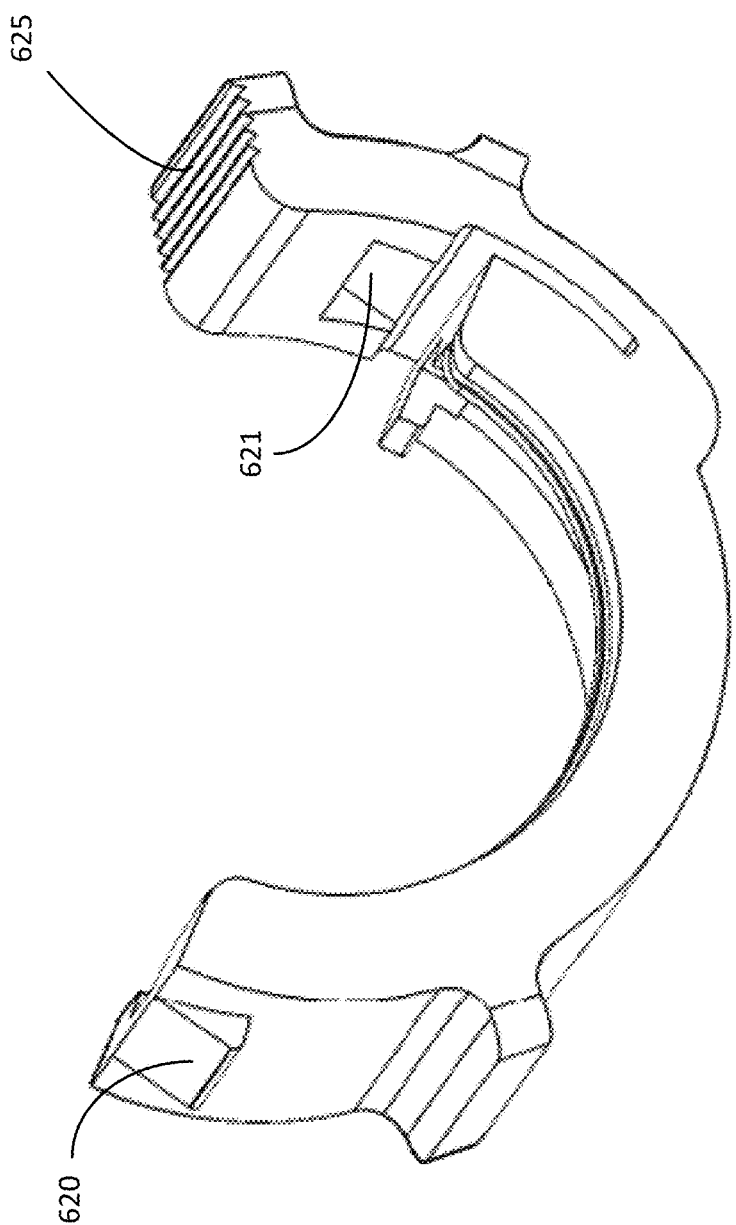
Figure 6C:
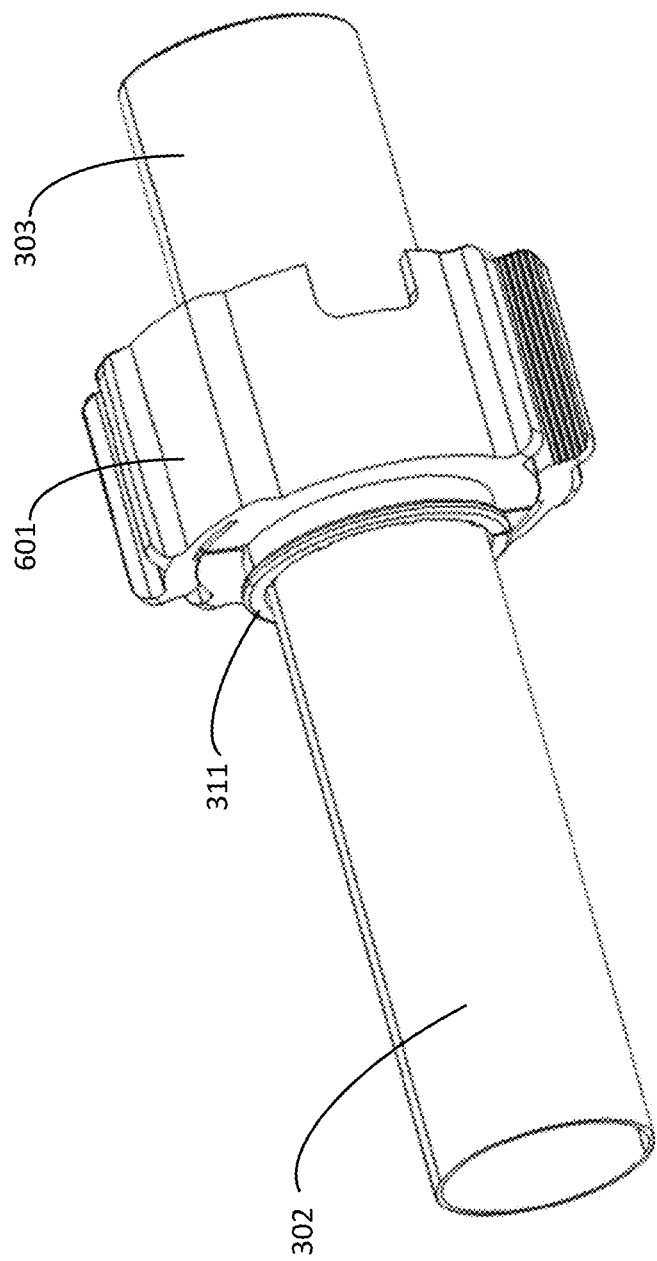

Once connectors are properly positioned within joint openings, securing clamps may be used to secure the connectors within the joint openings. For example, FIGS. 6A-6C illustrate examples of a securing clamp 601 that may be used to secure the connectors within joint openings. When constructing an airship, portions of the airship (e.g., connectors and joints) may be intentionally and unintentionally moved and/or rotated in various ways. Securing clamps 601 secure, or hold, the connectors 302 and joint openings 303 in place so their relative positions are secured even during such movements. The securing clamps also allow the connectors and joints to be held in place during the curing process, which minimizes the risk of defects that my occur during the curing process.

The securing clamps are designed to improve the safety, speed, and cost-efficiency of an airship construction. In particular embodiments, securing clamps 601 may be comprised of two interlocking, symmetrical components, as illustrated in FIG. 6B. The two interlocking components may be locked to each other by placing the caved-in portion 621 (e.g., the female portion) of one of the interlocking components over a protruding portion 620 (e.g., the male portion) of the other interlocking component. Each interlocking component may include a pliable arm 625 coupled to the caved-in portion 621 to allow a user to pull the caved-in portion 621 back and release the two interlocking components from each other. This design allows the securing clamps to be easily clamped on and clamped off without additional tools or equipment. FIG. 6C illustrates the securing clamp 601 clamped on the connector 302 and joint opening 303. The mechanism for securing pieces of joints and connectors, as described herein, may be applied to any of the joints or connectors used to construct an airship.

In particular embodiments, an injecting clamp may be used to inject adhesives into the space 340 corresponding to the overlapping portion between a connector 302 and joint opening 303 (illustrated in FIG. 5A). For example, FIGS. 7A-7E illustrate examples of an injecting clamp 701 that may be used to inject adhesives into the space 340 corresponding to the overlapping portion between the connector and joint opening.

The injecting clamps are designed to improve the safety, speed, and cost-efficiency of an airship construction. In particular embodiments, an injecting clamp 701 may be comprised of two interlocking, symmetrical components. For example, FIG. 7B illustrates one of the interlocking components of an injection clamp 701. The two interlocking components may be locked to each other by placing the caved-in portion 721 (e.g., the female portion) of one of the interlocking components over a protruding portion 720 (e.g., the male portion) of the other interlocking component. Each interlocking component may include a pliable arm 725 coupled to the caved-in portion 721 to allow a user to pull the caved-in portion 721 back and release the two interlocking components from each other. This design also allows the injecting clamps to be easily clamped on and clamped off without additional tools or equipment.

In particular embodiments, an injecting clamp 701 may have an inlet to which an adhesive is injected into, a cavity to which the adhesive fills into, and an outlet for the adhesive to flow out of. For example, FIG. 7E illustrates a vertical cross-sectional view of an example injecting clamp 701. FIG. 7E further illustrates an injecting hole 750 to which the adhesive may be injected into and a cavity 755 of the injecting clamp 701 that the adhesive may fill. FIG. 7F illustrates a horizontal cross-sectional view of the injecting clamp 701. FIG. 7F further illustrates curved outlets 760 to which adhesives may flow out of. As illustrated in FIG. 7E, the inlet may be disposed along one of the sides of an injecting clamp 701 (e.g., the side corresponding to the injecting hole 750) and the outlet 760 may be disposed along the interior surface of the injecting clamp 701. FIG. 7E further illustrates the cavity 755 being extended uniformly along the interior surface of the injecting clamp 701 while being tapered on the side away from the interior surface. In particular embodiments, an injecting clamp 701 tightened around a connector 302 may form a seal around the connector 302 such that the adhesive injected in the inlet (e.g., injecting hole 750) can only flow out of the outlet 760, effectively forming a pathway from the injecting hole 750 to the space 340.

Figure 7A:
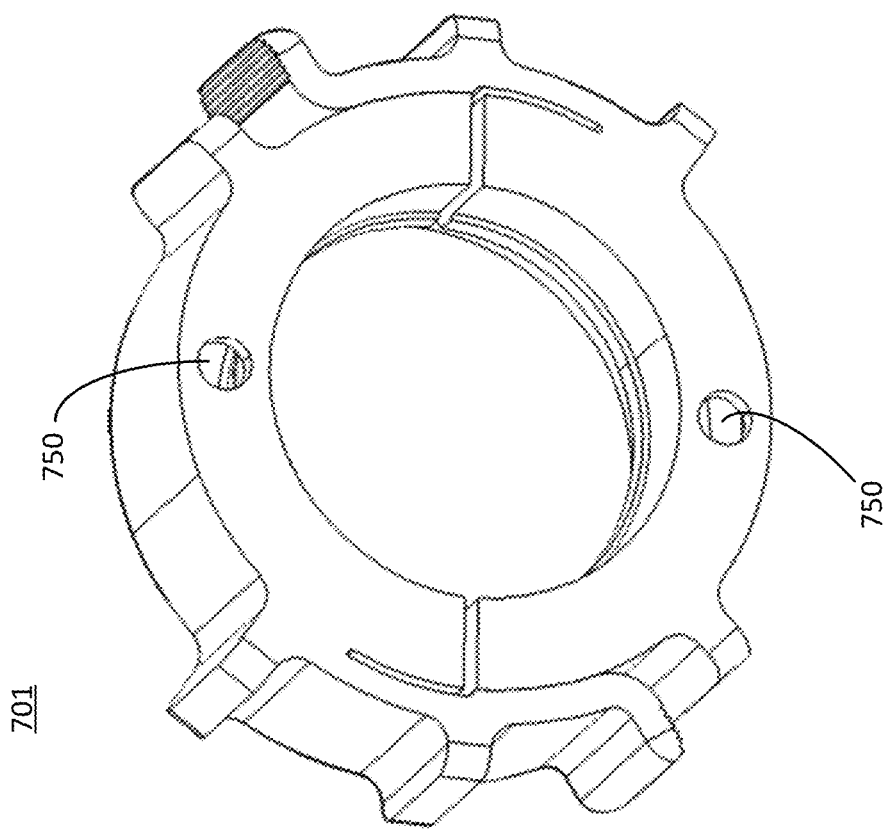
Figure 7C:
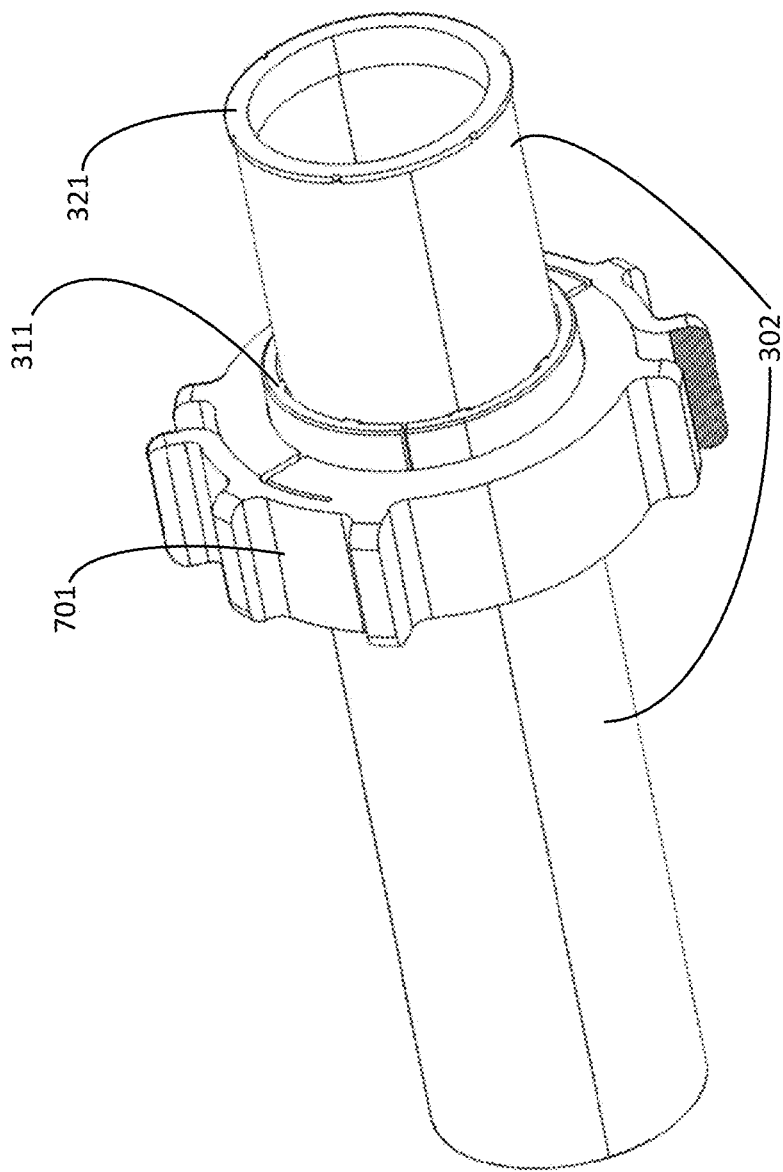
Figure 7D:
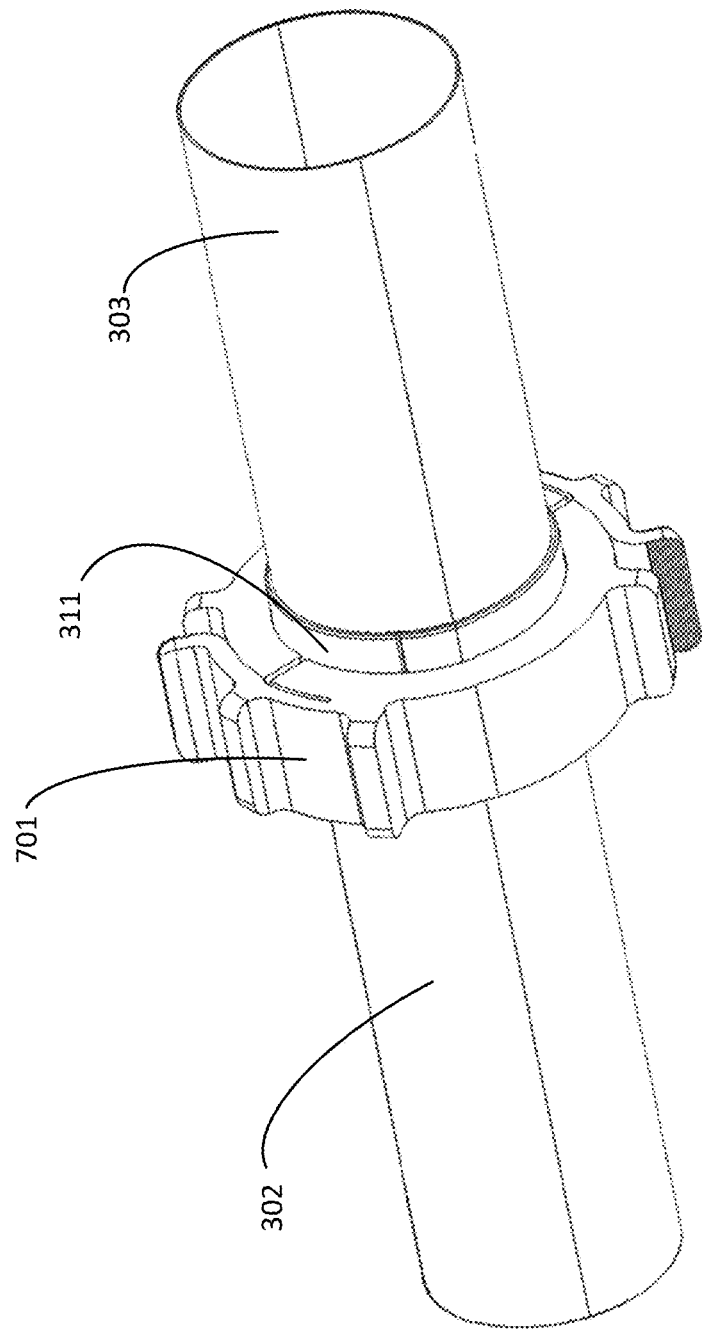
Figure 7G:
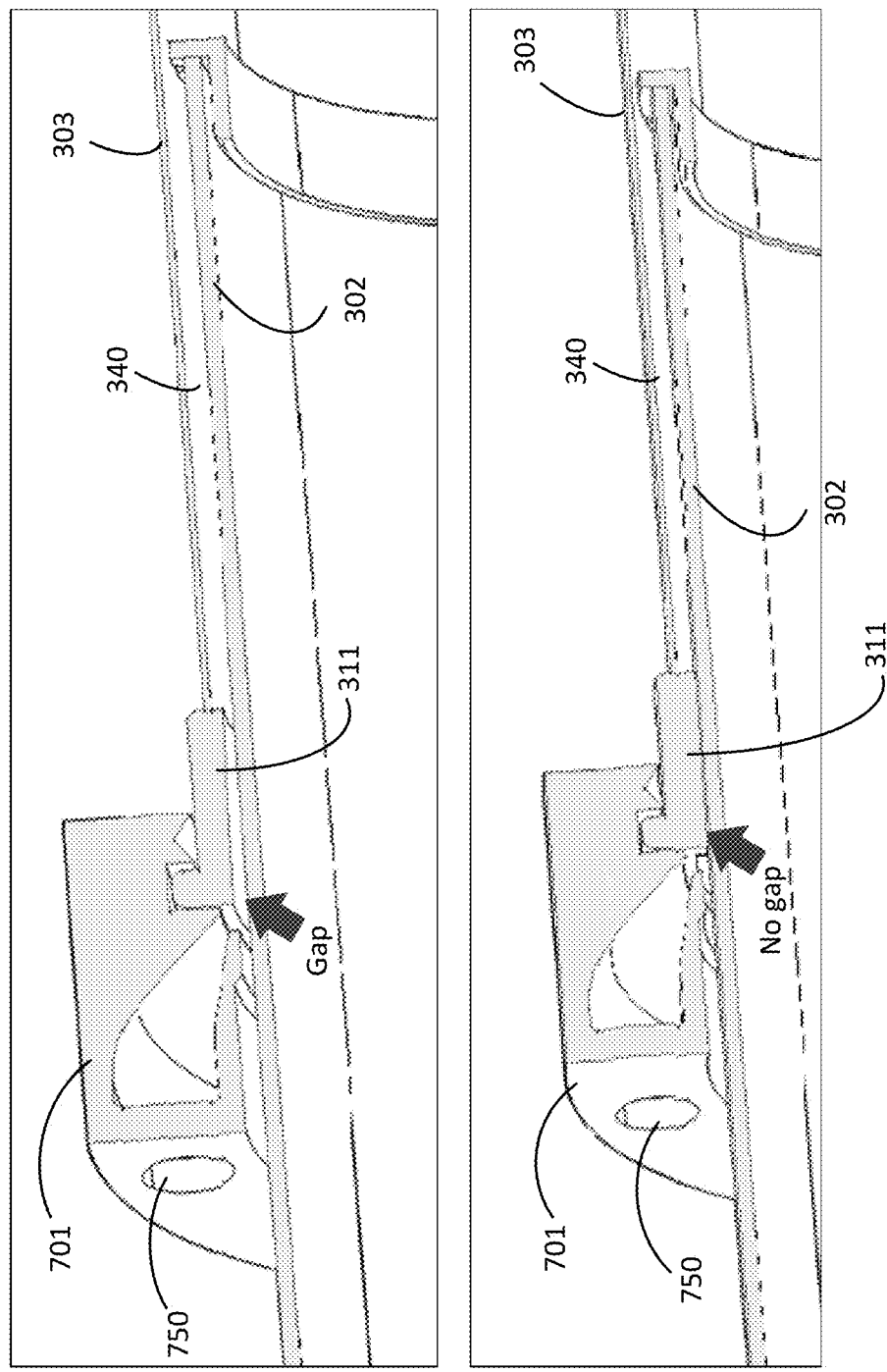

In particular embodiments, a spacer ring 311 may have internal protruding portions in contact with a connector 302, and in between the internal protruding portions, there may be gaps to which the adhesive flowing out of the outlets 760 of the injecting clamp 701 could flow through. FIG. 5B illustrates examples of internal protruding portions 315 along the inner circumference of the spacer ring 311. When a space ring 311 is configured around a connector 302, the internal protruding portions 315 may be in firm contact with the connector 302. The portions of the spacer ring 311 that are not in contact with the connector 302 (e.g., between the internal protruding portions 315) correspond to gaps to which an adhesive may flow through. For example, the top view of FIG. 5C illustrates gaps between the spacer ring 311 and the connector 302 along the inner circumference of the spacer rings, the gaps being separated by the internal protruding portions 315. These gaps provide a pathway for the adhesives to flow through after exiting the outlets 760 of the injecting clamp 701. To further clarify this process, FIG. 7G illustrates two zoomed-in, cross-sectional views of an injecting clamp 701, connector 302, and spacer ring 311, each cross-sectional view cut-off at different plane points (e.g., y-z or x-z plane). The top view illustrates a cross-sectional view that has been cut-off at a particular plane point to illustrate the gaps discussed above, e.g., where the spacer ring 311 is not in contact with the connector 302. The bottom view illustrates a cross-sectional view that has been cut-off at a particular plane point corresponding to one of the internal protruding portions 315. No gap is illustrated in the bottom view because the internal protruding portion is in firm contact with the connector 302. Adhesives that flow through the gaps go into the space 340 corresponding to the overlapping portion between a connector 302 and joint opening 303.

Figure 8A:
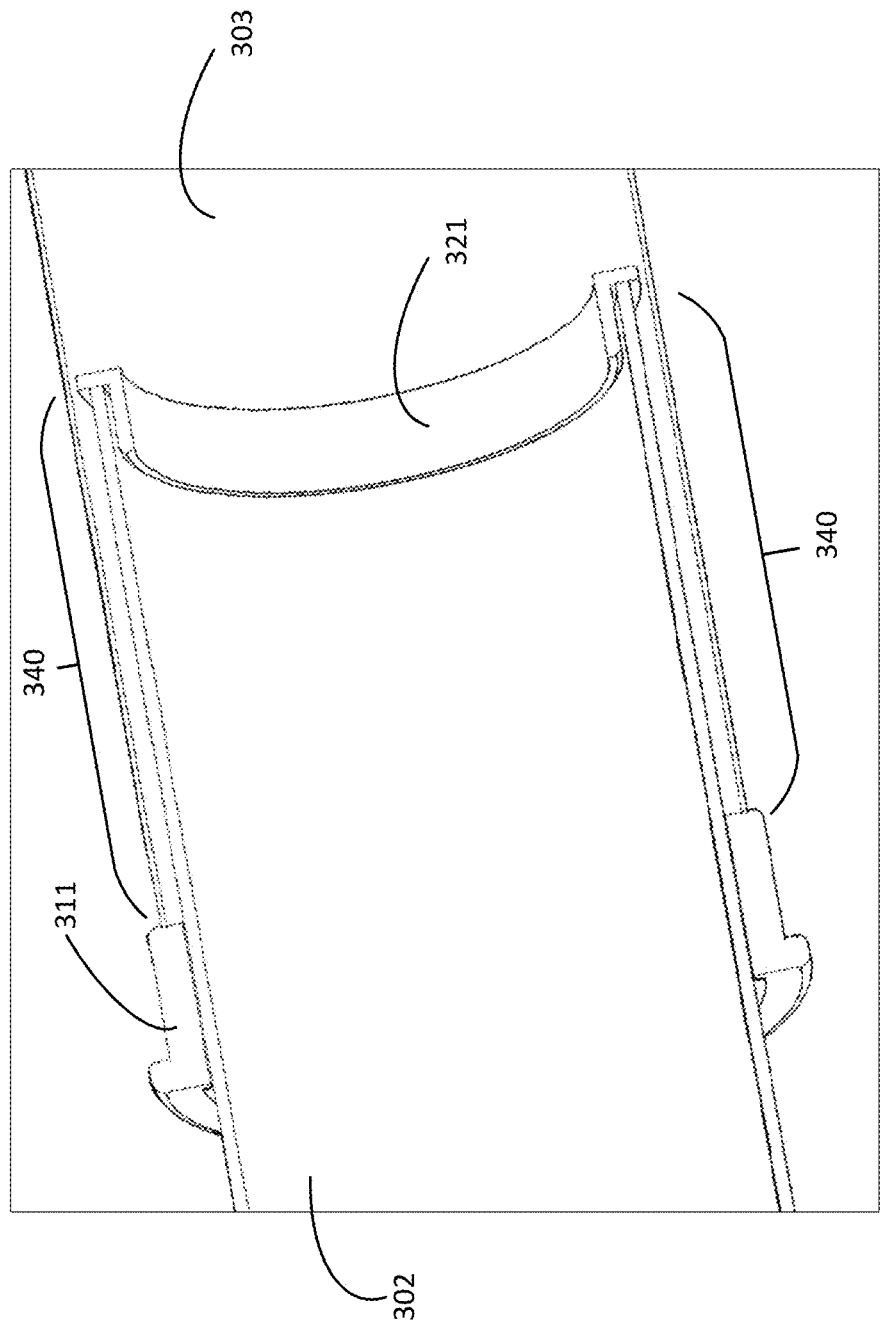
FIGS. 8A-8B illustrate exemplary cross sectional views of a spacer ring and a vent ring configured on a connector and a joint opening.
Figure 8B:
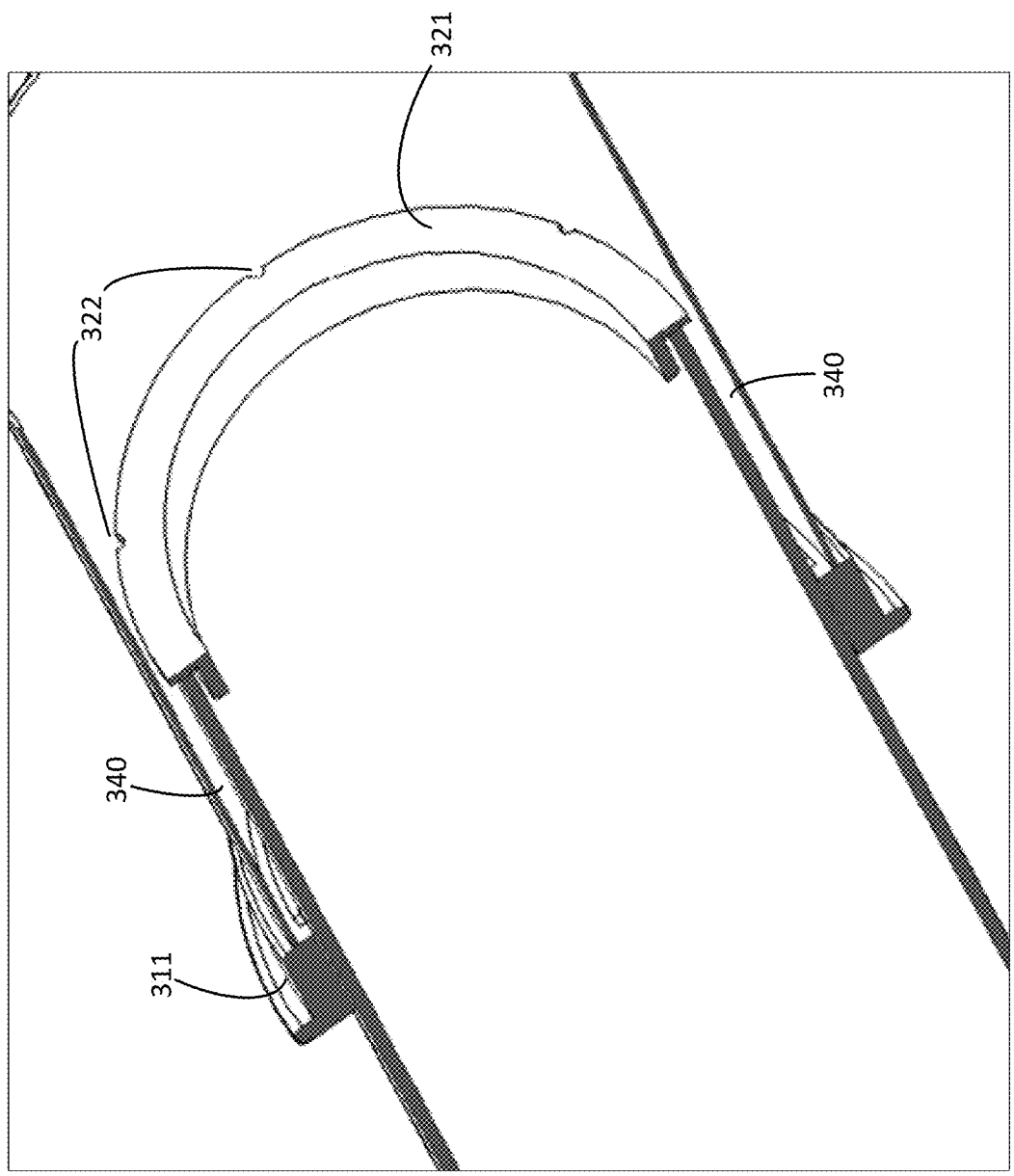

In particular embodiments, a vent ring 321 may be configured with weep holes 322 that serve as an outlet for the adhesive filled in the space 340. FIGS. 5D and 5E illustrate examples of vent rings 321 with weep holes 322. In particular embodiments, a vent ring 321 may form a seal around the connector 302 and joint opening 303 such that the adhesive injected into the space 340 can only flow out of the weep holes 322. For example, FIG. 8A illustrates a cross-sectional view of the space 340 in which the adhesive fills into, and FIG. 8B illustrates the same but from a different perspective to show the weep holes 322 to which adhesive may flow out of. In particular embodiments, weep holes 322 may be used to determine whether sufficient amount of adhesive has been injected into the space 340. Sufficient amount of an adhesive has been injected into the space 340 once the space 340 is fully filled with the adhesive in a uniformly distributed fashion and all air pockets in the space 340 have been pushed out. During the injecting process, an adhesive may be continuously injected until the adhesive can be seen flowing out of each of the weep holes 322 of a vent ring 321. To take the embodiment illustrated in FIG. 5E as an example, which illustrates a vent ring 321 with six weep holes 322, an adhesive may be injected until the adhesive flows out of all six weep holes 322. Although FIG. 5E illustrates an embodiment of a vent ring 321 with six weep holes 322, this Application contemplates any number of weep holes suitable for determining whether sufficient amount of adhesive has been injected into the space 340. This determination process ensures that the space 340 has been fully filled with the adhesive and all air pockets have been pushed out. The mechanism for injecting adhesives, as described herein, may be applied to any of the joints or connectors used to construct an airship.

In particular embodiments, adhesives that are used to attach joints and connectors together may be a single component adhesive with premixed adhesive components in their final proportions. The adhesive components of a single-component adhesive, for example, may be comprised of aerobic adhesives, cyanoacrylates, heat curing adhesives, epoxy resin, phenol-formaldehyde resins, radiation curing adhesives, silicon adhesives, or pressure adhesives. A single-component adhesive typically requires application of heat, light, or humidity to initiate the curing process. In other embodiments, adhesives that are used to attach joints and connectors together may be a two-component adhesive with adhesive components supplied as resin and hardener in separate containers. The adhesive components of a two-component adhesive, for example, may be comprised of epoxy resin, methyl methacrylates adhesives, silicon adhesives, or urethane adhesives. A two-component adhesive typically requires mixing of resin and hardener shortly prior to the application or injection of the adhesives. Once mixed, the two-component adhesive may begin to cure at room temperature with the curing process lasting up to several weeks. Depending on the type of adhesives used and the materials being cured, a particular heating profile may be applied to maximize the hardening of the adhesive during the curing process. As discussed below, the curing process discussed herein incorporates controllers and sensors to precisely apply heat at specific temperatures at specific rates to optimize the hardening of the adhesives.

Figure 9A:
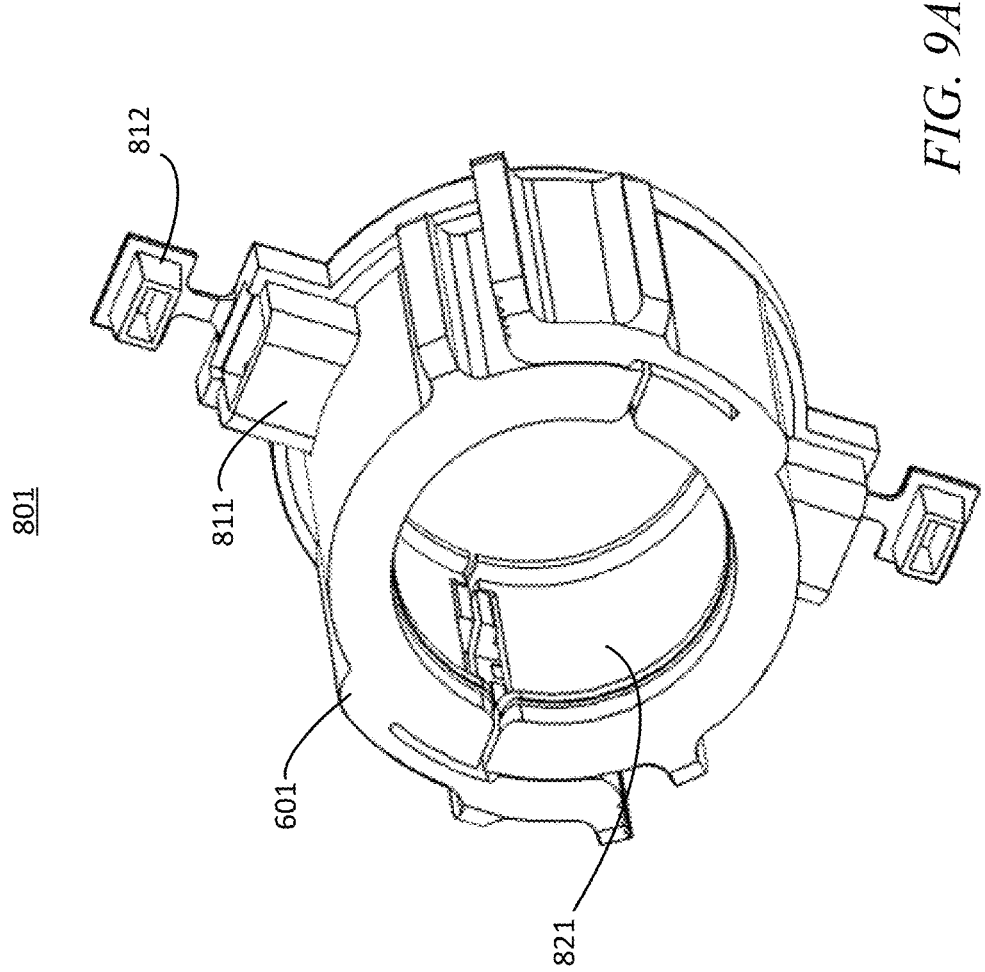
FIGS. 9A-9C illustrate examples of a heating clamp.
Figure 9B:
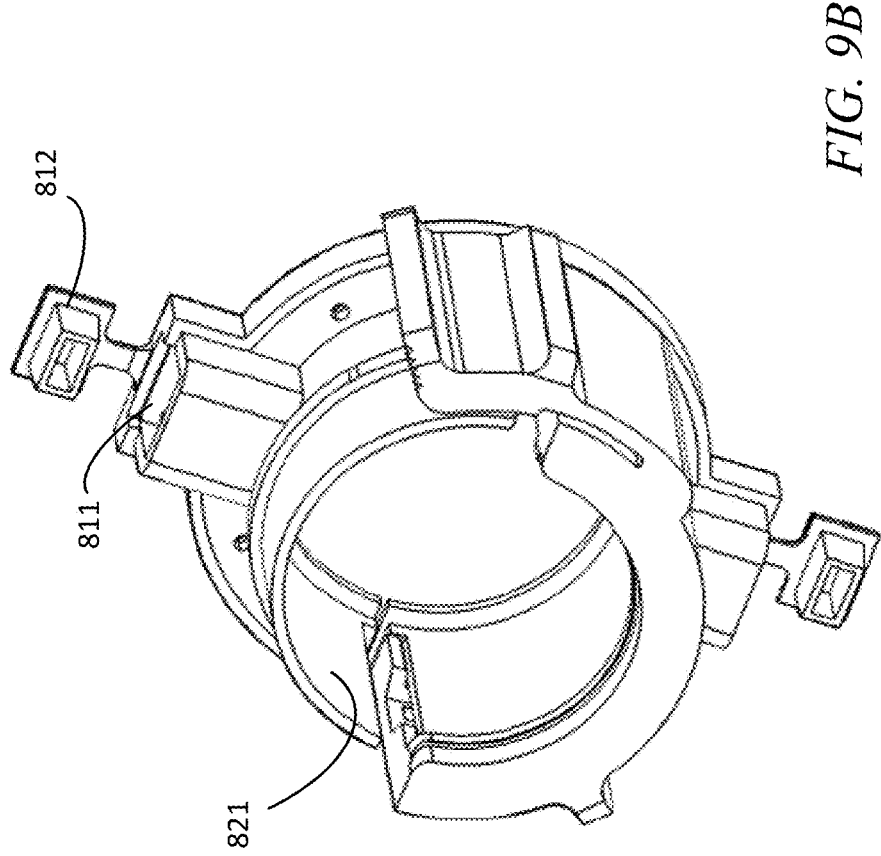
Figure 9C:
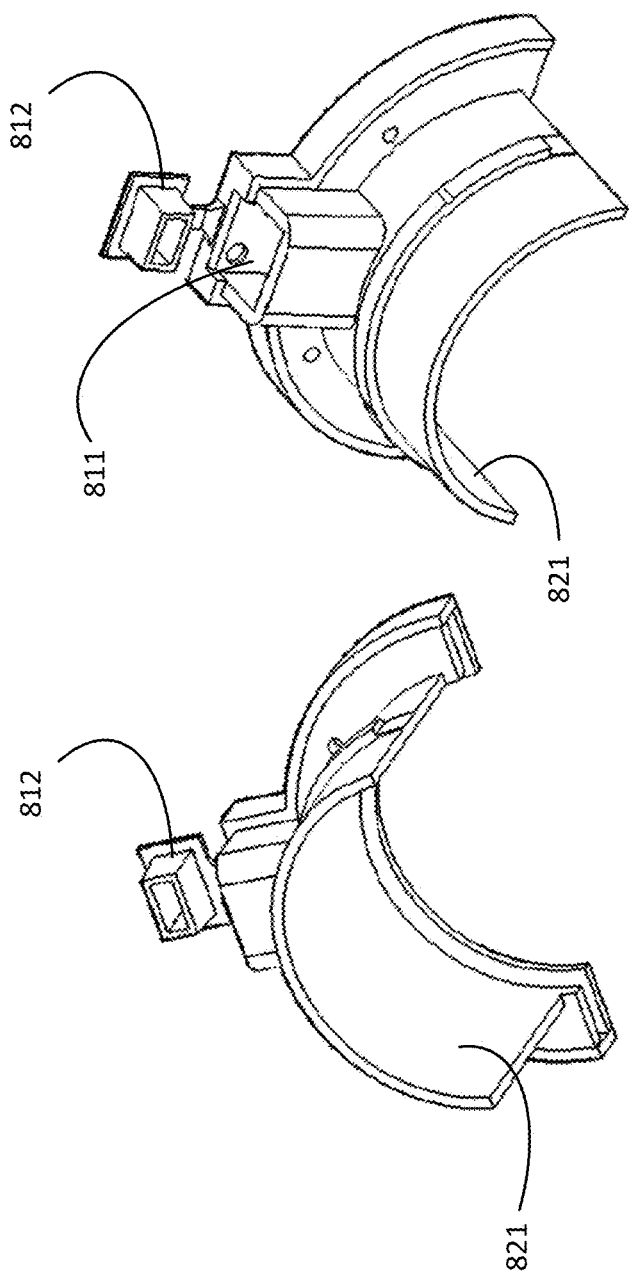

In particular embodiments, a securing clamp 601 may include a heating element for applying heat during the curing process. For example, FIG. 9A illustrates an example of a heating clamp 801 comprised of a securing clamp 601 with heating elements. The heating elements are constructed to be modular to allow them to be easily combined, or in the alternative, disassembled, with a securing clamp 601. Since a heating clamp 801 is comprised of a securing clamp 601 with heating elements, the heating clamp 801 may also be used to secure connectors and joint openings. FIG. 9B illustrates a heating clamp 801 without the top half of the securing clamp. FIG. 9C illustrates two views of the heating elements (e.g., the top half) that may be combined with a securing clamp. In particular embodiments, the heating elements may be comprised of, as illustrated in FIGS. 9B and 9C, a port 811 for transferring data and/or suppling power, a cap 812 for the port 811, a convex portion 821 (e.g., the inner surface) to which the heat source may be affixed to. The heating elements may also include additional elements that are not illustrated, including without limitation a controller for controlling heat applied by the heat source, a sensor for monitoring the heat applied, and a cut-off switch for automatically shutting off the heat source, for example, when the heat source overheats, or other problems or issues are detected. The controller may enable the heat source to apply heat based on a heating profile optimized the hardening of the adhesives during the curing process (e.g., amount of heat, rate of heating, timing of heat applied, etc.). The heating profile used for the curing process may include a ramp-up period, a maintain-period, and a cool-down period. During the ramp-up period, heat may be applied until the temperature of the heat source reaches a target temperature. Then during the maintain-period, the target temperature may be maintained for a pre-determined amount of time, at the end of which the adhesives may be fully cured. Once the target temperature is maintained for the pre-determined amount of time, the cool-down period may be initiated by turning off the heat source. For example, during the ramp-up period, heat may be applied until the temperature reaches the target temperature of 170° F. (which may take approximately twenty minutes), then at the maintain-period, the target temperature may be held for approximately sixty minutes, at the end of which the heat may be turned off. For each connector and joint bonded by the curing process, the heating profile used for that curing process may be monitored and stored, for example, for quality control.

In particular embodiments, the power supplied to the heat source and the data transferred to and from the controller, sensor, and/or the cut-off switch may be provided through a single cable plugged in the port 811. For example, the port 811 may be an ethernet port, which may be sufficient by itself to provide the necessary power and data transfer capabilities. In other embodiments, the heating elements may include additional ports and dedicate certain ports for power and others for data transfers. In some embodiments, the data transfer capabilities may be provided by a wireless transmitter. In yet other embodiments, the power may be supplied by a wireless power transmitter. The mechanism for the curing process described herein may be applied to any of the joints or connectors used for constructing an airship.

Figure 10A:
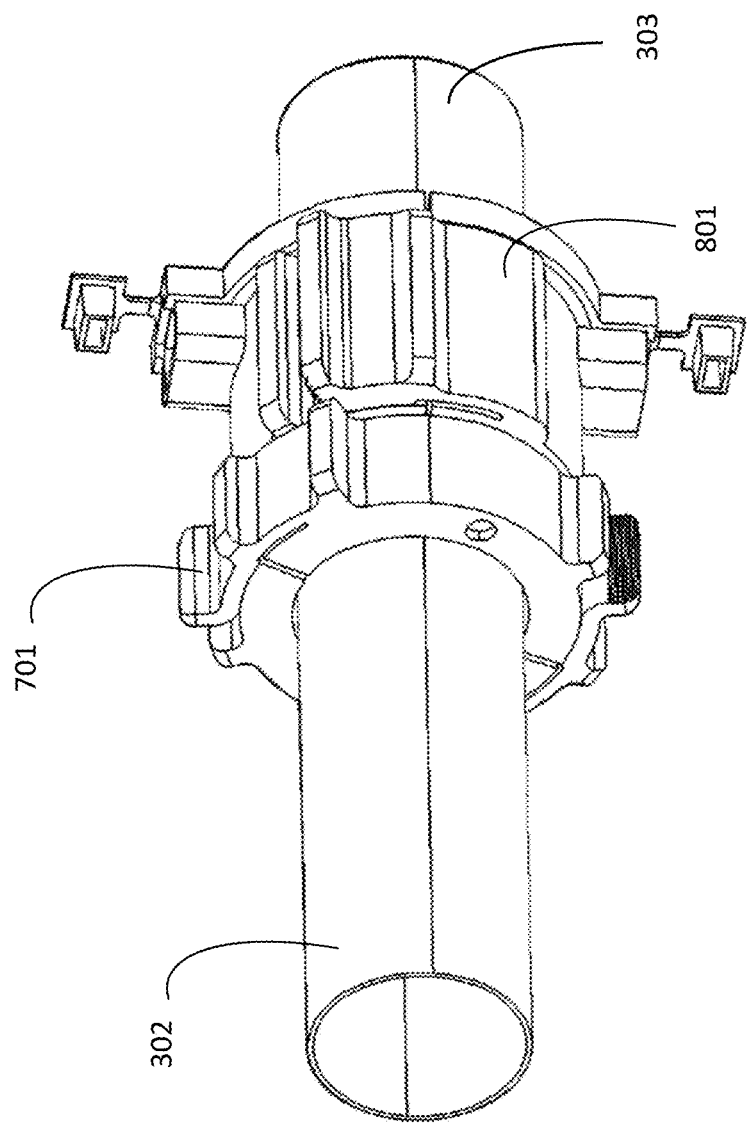
FIGS. 10A-10B illustrate an example of a heating clamp 801 and an injecting clamp 701 securing a connector 302 and a joint opening 303.
Figure 10B:
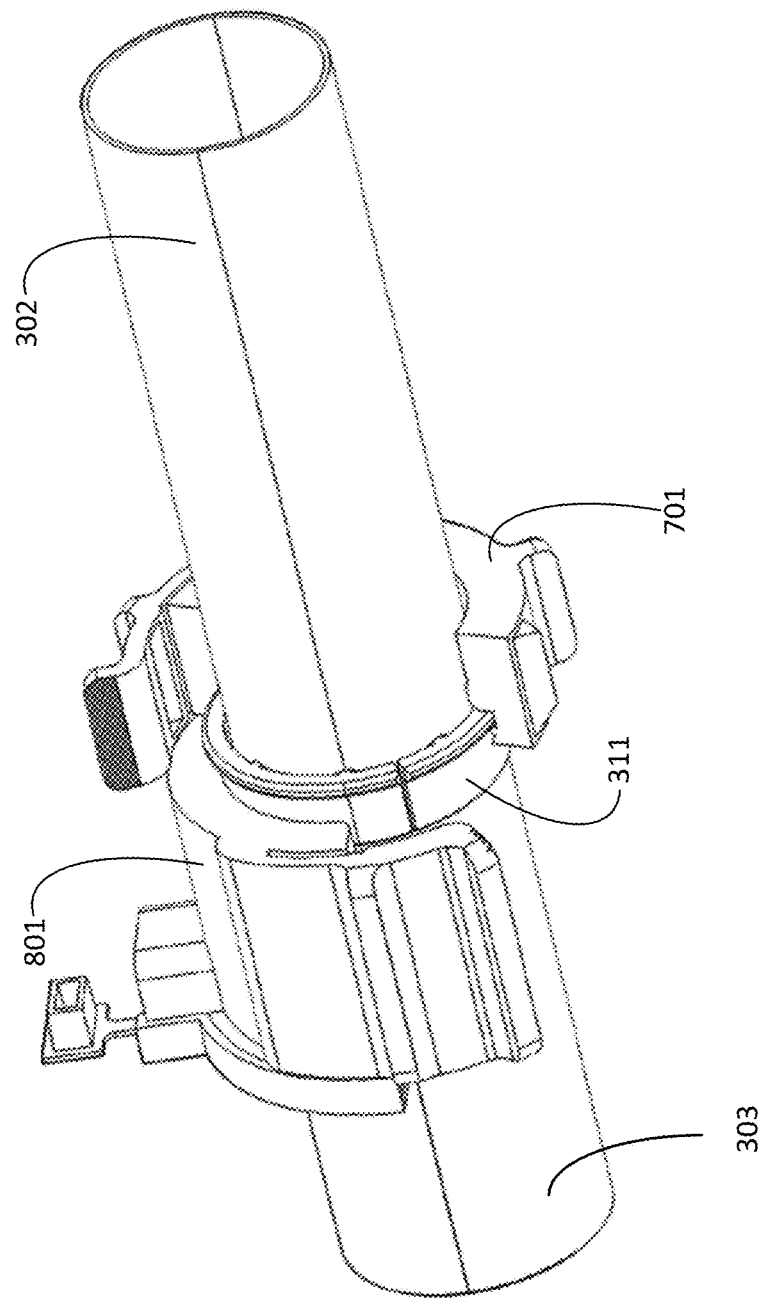

FIG. 10A illustrates an example of a heating clamp 801 and injecting clamp 701 securing a connector 302 and a joint opening 303. FIG. 10B illustrates the same but with only one half of the heating clamp 801 and one half of the injecting clamp 701 to illustrates how the spacer ring 311 is secured in place by the heating clamp 801. In an exemplary embodiment of the invention described herein, as illustrated in FIGS. 10A and 10B, the heating clamp 801 may be tightened over a joint opening 303 and a portion of a spacer ring 311 to secure the joint opening 303, spacer ring 311, and connector 302 that the spacer ring 311 wraps around. The embodiment illustrated in FIGS. 10A-10B provided a sealed pathway for the adhesive such that the adhesive may only flow into the injecting holes 750 and flow out of the weep holes 322. For example, an adhesive injected into the injecting holes 750 of the injecting clamp 701 may flow through the gaps between the internal protruding portions of the spacer ring 311, fill in the space 340 corresponding to the overlapping portion between a connector 302 and joint opening 303, then flow out of the weep holes 322 of the vent ring 321 once the space 340 has been fully filled.

In particular embodiments, a box curing system may be used to apply heat during the curing process. A box curing system may include a heat source and a thermally insulated container that encloses an entire joint. The thermally insulated container may include cut-outs to accommodate any connectors connected to the joint. The thermally insulated container may allow heat to be applied to the entire joint—which may comprise multiple joint openings—allowing multiple connectors and joint openings to be cured simultaneously. For example, referring to the joint 400 illustrated in FIG. 3, a thermally insulated container placed around the joint 400 may allow heat to be applied to the entire joint 400, allowing up to six connectors to be bonded to the joint at the same time. In particular embodiments, a box curing system may comprise a controller that controls the application of the heat applied by the heat source and a sensor that monitors the temperature of the heat applied by the heat source. The temperature controller may enable the heat source to apply heat based on a heating profile optimized the hardening of the adhesives during the curing process (e.g., amount of heat, rate of heating and cooling, timing of heat applied, etc.). The heating profile used for the curing process may include a ramp-up period, a maintain-period, and a cool-down period. During the ramp-up period, heat may be applied until the temperature of the heat source reaches a target temperature. Then during the maintain-period, the target temperature may be maintained for a pre-determined amount of time, at the end of which the adhesives may be fully cured. Once the target temperature is maintained for the pre-determined amount of time, the cool-down period may be initiated by turning off the heat source. For example, during the ramp-up period, heat may be applied until the temperature reaches the target temperature of 170° F. (which may take approximately twenty minutes), then at the maintain-period, the target temperature may be held for approximately sixty minutes, at the end of which the heat may be turned off. For each connector and joint bonded by the curing process, the heating profile used for that curing process may be monitored and stored, for example, for quality control.

In particular embodiments, a box curing system may comprise a cut-off switch for automatically shutting off the heat source of the box curing system, for example, when the heat source overheats, or some other problems or issues are detected. In particular embodiments, the power supplied to the heat source of the box curing system and the data transferred to and from the controller, sensor, and/or the cut-off switch may be provided through a single cable. For example, a single cable (e.g., ethernet cable) may be sufficient to provide the necessary power and data transfers capabilities. In other embodiments, power may be supplied by a separate cable. In some embodiments, the data transfer capabilities may be provided by a wireless transmitter. In yet other embodiments, the power may be supplied by a wireless power transmitter. The mechanism for the curing process described herein may be applied to any of the joints or connectors used for constructing an airship.

Figure 11:
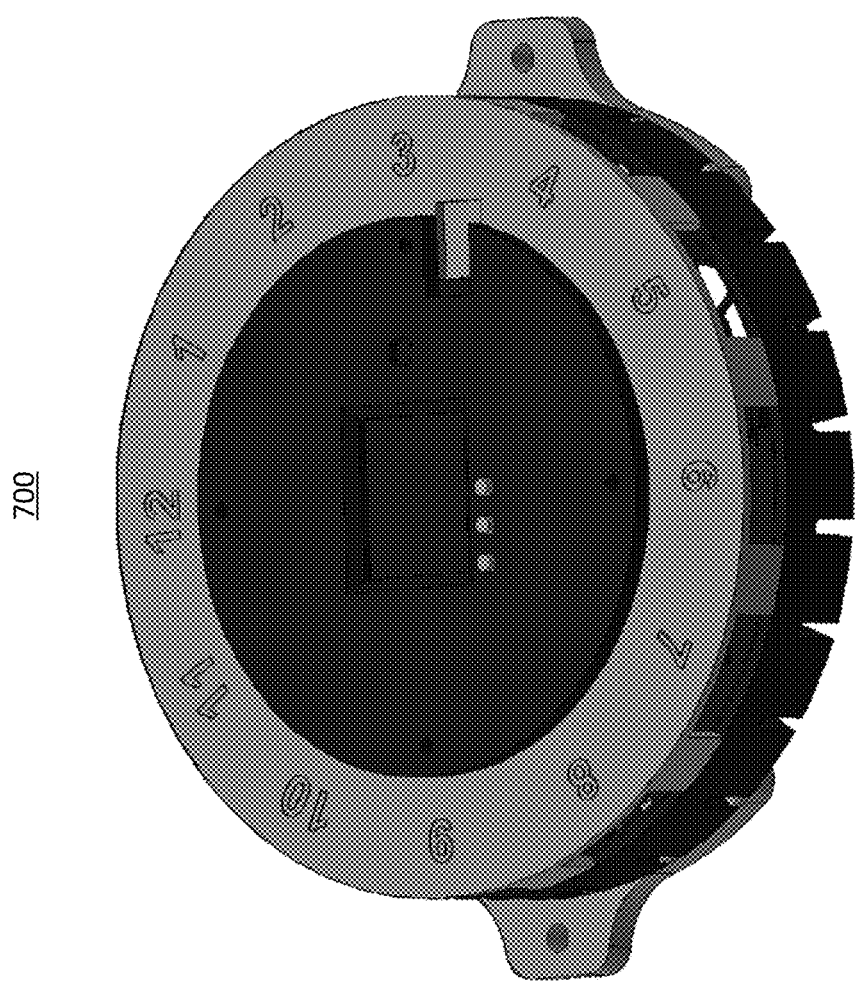
FIG. 11 illustrates an example controller hub that may be used to control and monitor multiple heating clamps or box curing systems.

FIG. 11 illustrates an example controller hub that may be used to control and monitor multiple heating clamps or box curing systems. For example, the controller hub 700 illustrated in FIG. 11 comprises twelve ports—each port being capable of supplying power and/or transferring data—allowing connections up to either twelve heating clamps, twelve box curing systems, or a combination of the securing/heating clamps and box curing systems. Although FIG. 11 illustrates a controller hub with twelve ports, this Application contemplates any number of ports suitable for constructing an airship. In particular embodiments, multiple controller hubs may be connected together and controlled by a central computing system, allowing simultaneous control of up to, for example, tens or hundreds of multiple box curing systems and/or heating clamps.

The apparatuses described above may be used to efficiently and cost-effectively build airships. In particular embodiments, each of the aforementioned joints used in the construction of a rigid airship's frame may be manufactured using molds. In particular embodiments, any of the molds described herein may be manufactured as follows. Each component of a mold (e.g., the male, female, or center piece) may be quickly and cost-effectively created using 3D printers. For instance, a digital 3D model defining a mold component may be sent to a 3D printer for printing. Layer by layer, the 3D printer may "print" the mold component based on its digital model. Any sufficiently strong material may be used, including but not limited to: nylon, ABS plastic, metal, resin, etc. In particular embodiments, the mold component may be solid with 3D-printing material. In other embodiments, the mold component may be designed to have a hollow cavity in the middle, with built-in external openings to the cavity. Once the shell of the mold component has been 3D-printed, cement or other suitable types of material may be injected into the cavity through the openings. Advantages of this process include, e.g., strengthening the mold component beyond what can be offered by the 3D-printing material alone, decreasing 3D-printing time (since less mass is printed), and reducing costs associated with 3D printing. Once the cement hardens, the mold component would be ready for use.

In particular embodiments, the mold components may be used to press against joint materials to create joints for the rigid airship. In particular embodiments, carbon-fiber twills may be used, as they have the desirable properties of being strong, lightweight, rigid, and initially pliable. The carbon-fiber twills may be treated with a hardening agent, such as epoxy resin. Thereafter, layers of twills may be placed between mold components. In particular embodiments, to aid subsequent detachment of the pressed carbon-fiber twills from the mold components, a layer of plastic sheet may be placed between the twills and each mold component. The mold components may then be pressed together so that corresponding portions designed to fit together are aligned with each other. A suitable amount of force may be applied to the molds to maintain their pressed configuration and to shape the carbon-fiber twills until they harden. The force may be applied by, e.g., using clamps, weights, or any other suitable means. Once the carbon-fiber twills harden, the mold components may be separated from each other to allow the carbon-fiber twills to be removed. In particular embodiments, the hardened carbon-fiber twills, which are then joint components, may be trimmed to remove undesirable or unneeded portions.

What is claimed is:

1. An apparatus for bonding connectors and joints of an airship structure, the apparatus comprising:
   a spacer ring adapted to couple to a joint opening of a joint, the spacer ring having a plurality of internal protruding portions adapted to form a gap between the spacer ring and a connector inserted into the joint through the joint opening;
   an injecting clamp adapted to clamp around at least a first portion of the spacer ring, the injecting clamp having an injecting hole for receiving an adhesive and an outlet for injecting the adhesive through the gap formed between the spacer ring and the connector to fill a space formed between the joint and a portion of the connector inserted into the joint; and
   a heating clamp adapted to clamp around a portion of the joint that surrounds the portion of the connector inserted into the joint, the heating clamp comprising a heat source adapted to heat the adhesive in the space formed between the joint and the portion of the connector during a curing process to bond the joint and the connector.

2. The apparatus of claim 1, wherein the heating clamp is further adapted to clamp around a second portion of the spacer ring, and the injecting clamp is further adapted to clamp around the connector.

3. The apparatus of claim 1, wherein the spacer ring aligns the connector to be substantially concentric with the joint opening.

4. The apparatus of claim 1, wherein the plurality of internal protruding portions of the spacer ring are adapted to be in contact with the connector inserted into the joint, and wherein the gap between the spacer ring and the connector is formed by portions of the spacer ring between the internal protruding portions that are not in contact with the connector.

5. The apparatus of claim 1, further comprising a vent ring adapted to couple to an end of the portion of the connector inserted into the joint.

6. The apparatus of claim 5, wherein the vent ring aligns the end of the portion of the connector inserted into the joint to be substantially concentric with the joint opening.

7. The apparatus of claim 5, wherein the vent ring comprises a plurality of weep holes adapted to allow the adhesive and air to flow out from the space formed between the joint and the portion of the connector inserted into the joint.

8. The apparatus of claim 1, further comprising a controller coupled to the heating clamp configured to control the heat source according to a heating profile.

9. A heating clamp for curing adhesives between connectors and joints of an airship structure, the heating clamp comprising:
   two interlocking components adapted to secure to each other around a portion of a joint that surrounds a portion of a connector inserted into the joint;
   wherein each of the two interlocking components comprises:
      a heat source disposed along an interior surface of the interlocking component, the heat source being adapted to heat an adhesive injected into a space formed between the portion of the joint and the portion of the connector inserted into the joint; and
      a port adapted to receive power for powering the heat source.

10. The heating clamp of claim 9, further comprising a controller coupled to each of the two interlocking components, the controller being configured to control the heat source according to a heating profile.

11. The heating clamp of claim 10, wherein the heating profile specifies an amount of heat and a rate of heat applied to the adhesive by the heat source.

12. The heating clamp of claim 10, wherein the heating profile comprises a ramp-up period, a maintain-period, and a cool-down period.

13. The heating clamp of claim 9, wherein each of the two interlocking components further comprises a sensor for monitoring the heat source.

14. The heating clamp of claim 9, wherein the port of each of the two interlocking components is further adapted to transfer data associated with the heat source.

15. The heating clamp of claim 9, wherein each of the two interlocking components further comprises a cut-off switch for cutting off the power to the heat source when the heat source exceeds a threshold temperature.

16. The heating clamp of claim 9, wherein each of the two interlocking components is releasably attached to the heat source and the port.

17. The heating clamp of claim 9, wherein each of the two interlocking components comprises a first end having a protruding portion and a second end having a caved-in portion, the caved-in portion of each one of the interlocking components being adapted to receive the protruding portion of the other one of the interlocking components to secure the two interlocking components to each other.

18. The heating clamp of claim 17, wherein the second end of each of the two interlocking components comprises a pliable arm on which the caved-in portion is disposed.

19. The heating clamp of claim 18, wherein the pliable arm of each of the two interlocking components is adapted to be pulled back by a user to release the two interlocking components from each other.

20. An injecting clamp for injecting adhesives between connectors and joints of an airship structure, the injecting clamp comprising:
   two interlocking components adapted to secure to each other around a connector inserted into a joint;
   wherein each of the two interlocking components comprises:
   an injecting hole on an exterior surface of the interlocking component, the injecting hole being adapted for receiving an adhesive from an external source; and
   a cavity having (1) an inlet coupled to the injecting hole and (2) an outlet disposed along an interior surface of the interlocking component, the inlet, the outlet, and the cavity forming a pathway for injecting the adhesive into a space formed between the connector and the joint.

21. The injecting clamp of claim 20, wherein the inlet is disposed along a first side of the cavity and the outlet is disposed along a second side of the cavity, the first side of the cavity being wider than the second side of the cavity.

22. The injecting clamp of claim 21, wherein the cavity tapers from the first side to the second side.

23. The injecting clamp of claim 20, wherein the cavity extends uniformly along the interior surface.

24. The injecting clamp of claim 20, wherein the outlet forms a curved opening adapted to abut a gap that corresponds to an opening to the space formed between the connector and the joint.

25. The injecting clamp of claim 24, wherein the gap is formed by a spacer ring coupled to a joint opening of the joint, wherein the interior surface of each of the interlocking components further comprises a concave portion adapted to secure the spacer ring, the concave portion being disposed adjacent to the outlet of the cavity.

26. The injecting clamp of claim 20, wherein each of the two interlocking components comprises a first end having a protruding portion and a second end having a caved-in portion, the caved-in portion of each one of the interlocking components being adapted to receive the protruding portion of the other one of the interlocking components to secure the two interlocking components to each other.

27. The injecting clamp of claim 26, wherein the second end of each of the two interlocking components comprises a pliable arm on which the caved-in portion is disposed.

28. The injecting clamp of claim 27, wherein the pliable arm of each of the two interlocking components is adapted to be pulled back by a user to release the two interlocking components from each other.

* * * * *